United States Patent
Zhao et al.

(10) Patent No.: US 11,388,428 B2
(45) Date of Patent: Jul. 12, 2022

(54) VIDEO DECODING METHOD AND VIDEO DECODER

(71) Applicant: HUAWEI TECHNOLOGIES CO., LTD., Guangdong (CN)

(72) Inventors: Yin Zhao, Hangzhou (CN); Haitao Yang, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/191,934

(22) Filed: Mar. 4, 2021

(65) Prior Publication Data
US 2021/0195226 A1 Jun. 24, 2021

Related U.S. Application Data

(63) Continuation of application No. PCT/CN2019/102944, filed on Aug. 28, 2019.

(30) Foreign Application Priority Data

Sep. 5, 2018 (CN) .......................... 201811032693.7
Sep. 21, 2018 (CN) .......................... 201811104788.5

(51) Int. Cl.
H04N 19/44 (2014.01)
H04N 19/105 (2014.01)
H04N 19/13 (2014.01)
H04N 19/176 (2014.01)
H04N 19/169 (2014.01)

(52) U.S. Cl.
CPC ........... *H04N 19/44* (2014.11); *H04N 19/105* (2014.11); *H04N 19/13* (2014.11); *H04N 19/176* (2014.11); *H04N 19/1883* (2014.11)

(58) Field of Classification Search
None
See application file for complete search history.

(56) References Cited

U.S. PATENT DOCUMENTS

| | | | |
|---|---|---|---|
| 9,210,442 B2 | 12/2015 | Panusopone et al. | |
| 2018/0020241 A1* | 1/2018 | Li | H04N 19/50 |

(Continued)

FOREIGN PATENT DOCUMENTS

| | | |
|---|---|---|
| CN | 103380620 A | 10/2013 |
| CN | 103518374 A | 1/2014 |

(Continued)

OTHER PUBLICATIONS

Xu Caifeng, HEVC Fast Coding Unit Partitioning Method, Telecom World, Apr. 2017, With an English Abstract, total 2 pages.

(Continued)

*Primary Examiner* — Chikaodili E Anyikire
(74) *Attorney, Agent, or Firm* — Womble Bond Dickinson (US) LLP

(57) ABSTRACT

The present disclosure discloses a video decoding method and a video decoder. The method includes: parsing coding tree split information to obtain a current node; determining coordinates of an upper-left corner of a region covered by a current quantization group based on a depth N of the current node; obtaining a QP delta of a current CU in the region covered by the current quantization group; and obtaining a reconstructed picture of the current CU based on the QP delta of the current CU.

18 Claims, 7 Drawing Sheets

(56) References Cited

U.S. PATENT DOCUMENTS

| | | | | |
|---|---|---|---|---|
| 2019/0230356 A1* | 7/2019 | Chao | ............ | H04N 19/157 |
| 2019/0273923 A1* | 9/2019 | Huang | ............ | H04N 19/124 |
| 2020/0344475 A1* | 10/2020 | Zhu | ............ | H04N 19/119 |
| 2021/0092372 A1* | 3/2021 | Misra | ............ | H04N 19/186 |
| 2021/0321098 A1* | 10/2021 | Chuang | ............ | H04N 19/96 |

FOREIGN PATENT DOCUMENTS

| | | |
|---|---|---|
| CN | 103702131 A | 4/2014 |
| CN | 106537918 A | 3/2017 |
| CN | 107566848 A | 1/2018 |
| CN | 107770525 A | 3/2018 |
| CN | 108353186 A | 7/2018 |
| WO | 2017203903 A1 | 11/2017 |
| WO | 2017203930 A1 | 11/2017 |
| WO | 2018013706 A1 | 1/2018 |
| WO | 2018018486 A1 | 2/2018 |
| WO | 2018019248 A1 | 2/2018 |

OTHER PUBLICATIONS

JCTVC-L1003_v11, Benjamin Bross et al., High Efficiency Video Coding (HEVC) text specification draft 10 (for FDIS and Consent), Joint Collaborative Team on Video Coding (JCT-VC) of ITU-T SG 16 WP 3 and 1S0/IEC JTC 1/SC 29/WG11, 12th Meeting: Geneva, CH, Jan. 14-23, 2013, total 332 pages. XP030056838.

ITU-T H.262 (Feb. 2012), Series H: Audiovisual and Multimedia Systems, Infrastructure of audiovisual services Coding of moving video Information technology—Generic coding of moving pictures and associated audio Information: Video: Frame packing arrangement signalling for 3D content, total 238 pages.

Dong-Hyeok Kim et al, Selective CU depth range decision algorithm for HEVC encoder, The 18th IEEE International Symposium on Consumer Electronics (ISCE 2014), Date of Conference: Jun. 22-25, 2014, total 2 pages.

JVET-L0362-v3, Yin Zhao et al, Quantization parameter signaling, Joint Video Experts Teani (JVET) of ITU-T SG 16 WP 3 and ISO/IEC JTC 1/SC 29/WG11, 12th Meeting: Macao, CN, Oct. 3-12, 2018, total 11 pages. XP030195099.

ITU-T H.263(Jan. 2005), Series H: Audiovisual and Multimedia Systems, Infrastructure of audiovisual services—Coding of moving video, Video coding for low bit rate communication, total 226 pages.

ITU-T H.264(Apr. 2017), Series H: Audiovisual and Multimedia Systems, Infrastructure of audiovisual services—Coding of moving video, Advanced video coding for generic audiovisual services, total 812 pages.

ITU-T H.265(Feb. 2018), Series H: Audiovisual and Multimedia Systems, Infrastructure of audiovisual services—Coding of moving video. High efficiency video coding, total 692 pages.

CCITT H.261 Line Transmission on Non-Telephone Signals, Video Codec for Audiovisual Services at p 64 kbit/s, Geneva, 1990, total 32 pages.

* cited by examiner

VIDEO DECODING METHOD AND VIDEO DECODER

CROSS-REFERENCE TO RELATED APPLICATIONS

This application is a continuation of International Application No. PCT/CN2019/102944, filed on Aug. 28, 2019, which claims priority to Chinese Patent Application No. 201811032693.7, filed on Sep. 5, 2018, and Chinese Patent Application No. 201811104788.5, filed on Sep. 21, 2018. All of the aforementioned patent applications are hereby incorporated by reference in their entireties.

TECHNICAL FIELD

Embodiments of this application generally relate to the video coding field, and more specifically, to a video decoding method and a video decoder.

BACKGROUND

Video coding (video encoding and decoding) is used in a wide range of digital video applications, for example, broadcast digital TV, video transmission over the internet and mobile networks, real-time conversational applications such as video chat and video conferencing, DVDs and Blu-ray discs, and security applications of video content collection and editing systems and camcorders.

With development of a block-based hybrid video coding approach in the H.261 standard in 1990, new video coding technologies and tools were developed and formed a basis for new video coding standards. Further video coding standards include MPEG-1 video, MPEG-2 video, ITU-T H.262/MPEG-2, ITU-T H.263, ITU-T H.264/MPEG-4 Part 10: advanced video coding (AVC), ITU-T H.265/high efficiency video coding (HEVC), and extensions, for example, scalability and/or 3D (three-dimensional) extensions of these standards. As video creation and use have become more ubiquitous, video traffic is the biggest load on communication networks and data storage. Therefore, one of the goals of most of the video coding standards is to achieve a bit rate reduction compared to a previous standard without sacrificing picture quality. Although the latest high efficiency video coding (HEVC) can compress a video about twice as much as AVC without sacrificing picture quality, there is a need for a new technology to further compress the video as compared with HEVC.

SUMMARY

Embodiments of this application provide a video decoding method and a video decoder, to improve decoding efficiency.

The foregoing and other objects are achieved by the subject matter of the independent claims. Other implementations are apparent from the dependent claims, the specification, and the accompanying drawings.

According to a first aspect, the present disclosure relates to a video decoding method. The method is performed by a video decoder. The method includes: parsing coding tree split information to obtain a current node; determining, based on a depth N of the current node, a region covered by a current quantization group; obtaining a quantization parameter (QP) delta of a current coding unit (CU) in the region covered by the current quantization group; and obtaining a reconstructed picture of the current CU based on the QP delta of the current CU.

It can be learned that, according to an embodiment of the video decoding method provided in the present disclosure, the region covered by the current quantization group can be determined based on the depth N of the current node, to ensure that a QP can match a CU, thereby avoiding that one CU corresponds to two different quantization groups (QGs), and can improve decoding efficiency.

In an embodiment, the depth N of the current node is a quadtree depth N of the current node. The determining, based on a depth N of the current node, a region covered by a current quantization group includes: determining, based on the depth N of the current node, the region covered by the current quantization group; or determining, based on a multi-type tree depth M of the current node, the region covered by the current quantization group. If N is greater than a first threshold (T1) or M is greater than 0, the region covered by the current quantization group is a region covered by a Kth-layer quadtree node of the current node. K is a smaller value between N and T1, and the $K^{th}$-layer quadtree node is a quadtree node that includes the current node and that is generated after K times of quadtree split starting from a coding tree unit CTU.

The $K^{th}$-layer quadtree node is an $(M+N-K)^{th}$-layer parent node of the current node.

It can be learned that, a QP coverage range is determined based on the CU, so that QP split can be more accurate, and decoding quality can be improved.

In an embodiment, the depth N of the current node is a quadtree depth N of the current node. The determining, based on a depth N of the current node, a region covered by a current quantization group includes: determining, based on the quadtree depth N of the current node and a multi-type tree depth M of the current node, the region covered by the current quantization group. If N is less than or equal to a first threshold T1 and M is equal to 0, the region covered by the current quantization group is a region covered by the current node.

It can be learned that, a QP coverage range is determined based on the CU, so that QP split can be more accurate, and decoding quality can be improved.

In an embodiment, the depth N of the current node is a quadtree depth N of the current node. The determining, based on a depth N of the current node, a region covered by a current quantization group includes: determining, based on the quadtree depth N of the current node, the region covered by the current quantization group; or determining, based on the quadtree depth N of the current node and a multi-type tree depth M of the current node, the region covered by the current quantization group. If N is equal to a first threshold T1 and M is equal to 0, the region covered by the current quantization group is a region covered by the current node. Alternatively, if N is less than a first threshold T1, the region covered by the current quantization group is a region covered by the current node.

It can be learned that, a QP coverage range is determined based on the CU, so that QP split can be more accurate, and decoding quality can be improved.

In an embodiment, the depth N of the current node is a quadtree depth N of the current node. The determining, based on a depth N of the current node, a region covered by a current quantization group includes: determining, based on the quadtree depth N of the current node and a multi-type tree depth M of the current node, the region covered by the current quantization group. If N is equal to a first threshold T1 and M is equal to 0, the region covered by the current quantization group is a region covered by the current node. Alternatively, if N is less than a first threshold T1 and M is less than or equal to a fourth threshold T4, the region covered by the current quantization group is a region covered by the current node.

In an embodiment, the fourth threshold T4 may be a preset positive integer, for example, 1, 2, 3, or 4.

In an embodiment, the fourth threshold may be determined based on the first threshold T1 and the quadtree depth N of the current node, for example, may be T4=T1−N.

It can be learned that, a QP coverage range is determined based on the CU, so that QP split can be more accurate, and decoding quality can be improved.

In an embodiment, the depth N of the current node is a quadtree depth N of the current node. The determining, based on a depth N of the current node, a region covered by a current quantization group includes: determining, based on the quadtree depth N of the current node and a multi-type tree depth M of the current node, the region covered by the current quantization group. If N is less than or equal to a first threshold T1 and M is less than or equal to T1−N, the region covered by the current quantization group is a region covered by the current node.

It can be learned that, a QP coverage range is determined based on the CU, so that QP split can be more accurate, and decoding quality can be improved.

In an embodiment, the determining, based on a depth N of the current node, a region covered by a current quantization group includes: if the depth N of the current node is greater than a first threshold T1, obtaining an $(N-T1)^{th}$-layer parent node of the current node; and determining that the region covered by the current quantization group is a region covered by the $(N-T1)^{th}$-layer parent node.

It can be learned that, a QP coverage range is determined based on the CU, so that QP split can be more accurate, and decoding quality can be improved.

In an embodiment, the determining, based on a depth N of the current node, a region covered by a current quantization group includes: if the depth N of the current node is equal to a first threshold T1, determining that the region covered by the current quantization group is a region covered by the current node.

It can be learned that the depth N of the current node is directly compared with the first threshold T1, to determine the region covered by the current quantization group. In this way, a decoding speed is improved.

In an embodiment, the depth of the current node is the QT depth of the current node, or the depth of the current node is a sum of the QT depth of the current node and the MTT depth of the current node.

It can be learned that a balance can be achieved between the decoding speed and the decoding quality by using different depth determining manners, to improve final decoding efficiency.

In an embodiment, the first threshold T1 is 0, 1, 2, or 3.

In an embodiment, the method further includes: obtaining a split mode of the current node. The determining, based on a depth N of the current node, a region covered by a current quantization group includes: if the depth N of the current node is equal to a second threshold T2 minus 1, and the split mode of the current node is a ternary split mode, determining that the region covered by the current quantization group is a region covered by the current node; or if the depth N of the current node is equal to a second threshold T2, and the split mode of the current node is a binary split mode or a quadtree split mode, determining that the region covered by the current quantization group is a region covered by the current node; or if the depth of the current node is less than or equal to a second threshold, and the current node is no longer split, determining that the region covered by the current quantization group is a region covered by the current node.

It can be learned that, for different cases, different manners are used to determine the region covered by the current quantization group, so that QG split precision can be improved, thereby improving decoding precision.

In an embodiment, the second threshold is 2, 3, 4, 6, 8, or 9.

In an embodiment, the second threshold may be set to X times the first threshold, where X is an integer greater than 1. For example, X is 2, 3, or 4.

In an embodiment, the method further includes: obtaining a split mode of the current node. The determining, based on a depth N of the current node, a region covered by a current quantization group includes: if the depth N of the current node is equal to a third threshold T3 minus 1, and the split mode of the current node is a ternary split mode or a quadtree split mode, determining that the region covered by the current quantization group is a region covered by the current node; or if the depth N of the current node is equal to a third threshold T3, and the split mode of the current node is a binary split mode, determining that the region covered by the current quantization group is a region covered by the current node; or if the depth N of the current node is equal to a third threshold T3, and the current node is no longer split, determining that the region covered by the current quantization group is a region covered by the current node.

It can be learned that, for different cases, different manners are used to determine the region covered by the current quantization group, so that QG split precision can be improved, thereby improving decoding precision.

In an embodiment, the third threshold is 3 or 5.

In an embodiment, the depth N of the current node is determined based on a QT depth of the current node and a binary depth Db of the current node.

In an embodiment, the depth N of the current node is determined by using the following calculation formula: N=Dq*2+Db, where Dq is the QT depth of the current node.

In an embodiment, if the current node is an MTT root node, the binary depth Db of the current node is 0; or if the current node is an MTT node and is not an MTT root node, and the current node is a child node obtained in the binary split mode, the binary depth Db of the current node is a binary depth of a direct parent node of the current node plus 1; or if the current node is an MTT node and is not an MTT root node, and the current node is a middle child node obtained in the ternary split mode, the binary depth Db of the current node is a binary depth of a direct parent node of the current node plus 1; or if the current node is an MTT node and is not an MTT root node, and the current node is a non-middle child node obtained in the ternary split mode, the binary depth Db of the current node is a binary depth of a direct parent node of the current node plus 2.

It can be learned that, for different cases, different manners are used to determine the depth, so that QG split precision can be improved, thereby improving decoding precision.

In an embodiment, if a QP delta of a first CU having a residual in the current quantization group is not equal to 0, luminance QPs of all CUs whose coding sequences are before that of the first CU having a residual in the current quantization group are modified to a luminance QP of the first CU having a residual.

If the current CU is a CU before the first CU having a residual in the current quantization group, the obtaining a reconstructed picture of the current CU based on the QP delta of the current CU is specifically:

obtaining the reconstructed picture of the current CU based on the luminance QP of the first CU having a residual.

According to a second aspect, the present disclosure relates to a video decoder. The video decoder includes: an entropy decoding unit, configured to: parse coding tree split information to obtain a current node, determine, based on a depth N of the current node, a region covered by a current quantization group, obtain a QP delta of a current CU in the region covered by the current quantization group, and determine a luminance QP of the current CU based on the QP delta of the current CU; an inverse quantization unit, configured to obtain a dequantized coefficient of the current CU based on the luminance QP of the current CU; an inverse transform processing unit, configured to obtain a reconstructed residual block of the current CU based on the dequantized coefficient of the current CU; and a reconstruction unit, configured to obtain a reconstructed picture of the current CU based on the reconstructed residual block of the current CU.

In an embodiment, the depth N of the current node is a quadtree depth N of the current node. The entropy decoding unit is specifically configured to: determine, based on the depth N of the current node, the region covered by the current quantization group; or determine, based on a multi-type tree depth M of the current node, the region covered by the current quantization group. If N is greater than a first threshold T1 or M is greater than 0, the region covered by the current quantization group is a region covered by a $K^{th}$-layer quadtree node of the current node. K is a smaller value between N and T1, and the Kth-layer quadtree node is a quadtree node that includes the current node and that is generated after K times of quadtree split starting from a coding tree unit CTU.

The $K^{th}$-layer quadtree node is an $(M+N-K)^{th}$-layer parent node of the current node.

In an embodiment, the depth N of the current node is a quadtree depth N of the current node. The entropy decoding unit is specifically configured to determine, based on the quadtree depth N of the current node and a multi-type tree depth M of the current node, the region covered by the current quantization group. If N is less than or equal to a first threshold T1 and M is equal to 0, the region covered by the current quantization group is a region covered by the current node.

In an embodiment, the depth N of the current node is a quadtree depth N of the current node. The entropy decoding unit is specifically configured to: determine, based on the quadtree depth N of the current node, the region covered by the current quantization group, or determine, based on the quadtree depth N of the current node and a multi-type tree depth M of the current node, the region covered by the current quantization group. If N is equal to a first threshold T1 and M is equal to 0, the region covered by the current quantization group is a region covered by the current node. Alternatively, if N is less than a first threshold T1, the region covered by the current quantization group is a region covered by the current node.

In an embodiment, the depth N of the current node is a quadtree depth N of the current node. The entropy decoding unit is specifically configured to determine, based on the quadtree depth N of the current node and a multi-type tree depth M of the current node, the region covered by the current quantization group. If N is equal to a first threshold T1 and M is equal to 0, the region covered by the current quantization group is a region covered by the current node. Alternatively, if N is less than a first threshold T1 and M is less than or equal to a fourth threshold T4, the region covered by the current quantization group is a region covered by the current node.

In an embodiment, the fourth threshold T4 may be a preset positive integer, for example, 1, 2, 3, or 4.

In an embodiment, the fourth threshold may be determined based on the first threshold T1 and the quadtree depth N of the current node, for example, may be T4=T1−N.

In an embodiment, the depth N of the current node is a quadtree depth N of the current node. The entropy decoding unit is specifically configured to determine, based on the quadtree depth N of the current node and a multi-type tree depth M of the current node, the region covered by the current quantization group. If N is less than or equal to a first threshold T1 and M is less than or equal to T1−N, the region covered by the current quantization group is a region covered by the current node.

In an embodiment, the entropy decoding unit is specifically configured to: if the depth N of the current node is greater than a first threshold T1, obtain an $(N-T1)^{th}$-layer parent node of the current node; and determine that the region covered by the current quantization group is a region covered by the $(N-T1)^{th}$-layer parent node.

In an embodiment, the entropy decoding unit is specifically configured to: if the depth N of the current node is equal to a first threshold T1, determine that the region covered by the current quantization group is a region covered by the current node.

In an embodiment, the depth of the current node is the QT depth of the current node, or the depth of the current node is a sum of the QT depth of the current node and the MTT depth of the current node.

In an embodiment, the first threshold T1 is 0, 1, 2, or 3.

In an embodiment, the entropy decoding unit is further configured to: obtain a split mode of the current node; and if the depth N of the current node is equal to a second threshold T2 minus 1, and the split mode of the current node is a ternary split mode, determine that the region covered by the current quantization group is a region covered by the current node; or if the depth N of the current node is equal to a second threshold T2, and the split mode of the current node is a binary split mode or a quadtree split mode, determine that the region covered by the current quantization group is a region covered by the current node; or if the depth N of the current node is less than or equal to a second threshold, and the current node is no longer split, determine that the region covered by the current quantization group is a region covered by the current node.

In an embodiment, the second threshold is 2, 3, 4, 6, 8, or 9.

In an embodiment, the entropy decoding unit is further configured to: obtain a split mode of the current node; and if the depth N of the current node is equal to a third threshold T3 minus 1, and the split mode of the current node is a ternary split mode or a quadtree split mode, determine that the region covered by the current quantization group is a region covered by the current node; or if the depth N of the current node is equal to a third threshold T3, and the split mode of the current node is a binary split mode, determine that the region covered by the current quantization group is a region covered by the current node; or if the depth N of the current node is equal to a third threshold T3, and the current node is no longer split, determine that the region covered by the current quantization group is a region covered by the current node.

In an embodiment, the third threshold is 3 or 5.

In an embodiment, the entropy decoding unit is specifically configured to determine the depth N of the current node based on a QT depth of the current node and a binary depth Db of the current node.

In an embodiment, the entropy decoding unit is specifically configured to determine the depth N of the current node by using the following calculation formula: N=Dq*2+Db, where Dq is the QT depth of the current node.

In an embodiment, if the current node is an MTT root node, the binary depth Db of the current node is 0; or if the current node is an MTT node and is not an MTT root node, and the current node is a child node obtained in the binary split mode, the binary depth Db of the current node is a binary depth of a direct parent node of the current node plus 1; or if the current node is an MTT node and is not an MTT root node, and the current node is a middle child node obtained in the ternary split mode, the binary depth Db of the current node is a binary depth of a direct parent node of the current node plus 1; or if the current node is an MTT node and is not an MTT root node, and the current node is a non-middle child node obtained in the ternary split mode, the binary depth Db of the current node is a binary depth of a direct parent node of the current node plus 2.

In an embodiment, the entropy decoding unit is further configured to: if a QP delta of a first CU having a residual in the current quantization group is not equal to 0, modify luminance QPs of all CUs whose coding sequences are before that of the first CU having a residual in the current quantization group to a luminance QP of the first CU having a residual. If the current CU is a CU before the first CU having a residual in the current quantization group, the inverse quantization unit is specifically configured to obtain the dequantized coefficient of the current CU based on the luminance QP of the first CU having a residual.

According to a third aspect, an embodiment of the present disclosure provides a video decoding method, including: parsing coding tree split information to obtain a current node; determining, based on a depth N of the current node, coordinates of an upper-left corner of a region covered by a current quantization group; obtaining a quantization parameter (QP) delta of a current coding unit (CU) in the region covered by the current quantization group; and obtaining a reconstructed picture of the current CU based on the QP delta of the current CU.

In an embodiment, the depth N of the current node is a quadtree depth N of the current node. The determining, based on a depth N of the current node, coordinates of an upper-left corner of a region covered by a current quantization group includes: determining, based on the depth N of the current node, the coordinates of the upper-left corner of the region covered by the current quantization group; or determining, based on a multi-type tree depth M of the current node, the coordinates of the upper-left corner of the region covered by the current quantization group. If N is greater than a first threshold T1 or M is greater than 0, the coordinates of the upper-left corner of the region covered by the current quantization group are coordinates of an upper-left corner of a region covered by a Kth-layer quadtree node of the current node. K is a smaller value between N and T1, and the Kth-layer quadtree node is a quadtree node that includes the current node and that is generated after K times of quadtree split starting from a coding tree unit CTU.

In an embodiment, the depth N of the current node is a quadtree depth N of the current node. The determining, based on a depth N of the current node, coordinates of an upper-left corner of a region covered by a current quantization group includes: determining, based on the quadtree depth N of the current node and a multi-type tree depth M of the current node, the coordinates of the upper-left corner of the region covered by the current quantization group. If N is less than or equal to a first threshold T1 and M is equal to 0, the coordinates of the upper-left corner of the region covered by the current quantization group are coordinates of an upper-left corner of a region covered by the current node.

In an embodiment, the depth N of the current node is a quadtree depth N of the current node. The determining, based on a depth N of the current node, coordinates of an upper-left corner of a region covered by a current quantization group includes: determining, based on the quadtree depth N of the current node, the coordinates of the upper-left corner of the region covered by the current quantization group; or determining, based on the quadtree depth N of the current node and a multi-type tree depth M of the current node, the coordinates of the upper-left corner of the region covered by the current quantization group. If N is equal to a first threshold T1 and M is equal to 0, the coordinates of the upper-left corner of the region covered by the current quantization group are coordinates of an upper-left corner of a region covered by the current node. Alternatively, if N is less than a first threshold T1, the coordinates of the upper-left corner of the region covered by the current quantization group are coordinates of an upper-left corner of a region covered by the current node.

In an embodiment, the depth N of the current node is a quadtree depth N of the current node. The determining, based on a depth N of the current node, coordinates of an upper-left corner of a region covered by a current quantization group includes: determining, based on the quadtree depth N of the current node and a multi-type tree depth M of the current node, the coordinates of the upper-left corner of the region covered by the current quantization group. If N is equal to a first threshold T1 and M is equal to 0, the coordinates of the upper-left corner of the region covered by the current quantization group are coordinates of an upper-left corner of a region covered by the current node. Alternatively, if N is less than a first threshold T1 and M is less than or equal to a fourth threshold T4, the coordinates of the upper-left corner of the region covered by the current quantization group are coordinates of an upper-left corner of a region covered by the current node.

In an embodiment, the depth N of the current node is a quadtree depth N of the current node. The determining, based on a depth N of the current node, coordinates of an upper-left corner of a region covered by a current quantization group includes: determining, based on the quadtree depth N of the current node and a multi-type tree depth M of the current node, the coordinates of the upper-left corner of the region covered by the current quantization group. If N is less than or equal to a first threshold T1 and M is less than or equal to T1−N, the coordinates of the upper-left corner of the region covered by the current quantization group are coordinates of an upper-left corner of a region covered by the current node.

In an embodiment, the determining, based on a depth N of the current node, coordinates of an upper-left corner of a region covered by a current quantization group includes: if the depth N of the current node is greater than a first threshold T1, obtaining an $(N-T1)^{th}$-layer parent node of the current node; and determining that the coordinates of the upper-left corner of the region covered by the current quantization group are coordinates of an upper-left corner of a region covered by the $(N-T1)^{th}$-layer parent node.

In an embodiment, the determining, based on a depth N of the current node, coordinates of an upper-left corner of a region covered by a current quantization group includes: if the depth N of the current node is equal to a first threshold T1, determining that the coordinates of the upper-left corner of the region covered by the current quantization group are coordinates of an upper-left corner of a region covered by the current node.

In an embodiment, the first threshold T1 is a preset nonnegative integer.

In an embodiment, the first threshold T1 is 0, 1, 2, or 3.

In an embodiment, the depth of the current node is the quadtree depth (QT depth) of the current node.

In an embodiment, the depth of the current node is a sum of the QT depth of the current node and the multi-type tree depth MTT depth of the current node.

In an embodiment, the method further includes: obtaining a split mode of the current node. The determining, based on a depth N of the current node, coordinates of an upper-left corner of a region covered by a current quantization group includes: if the depth N of the current node is equal to a second threshold T2 minus 1, and the split mode of the current node is a ternary split mode, determining that the coordinates of the upper-left corner of the region covered by the current quantization group are coordinates of an upper-left corner of a region covered by the current node; or if the depth N of the current node is equal to a second threshold T2, and the split mode of the current node is a binary split mode or a quadtree split mode, determining that the coordinates of the upper-left corner of the region covered by the current quantization group are coordinates of an upper-left corner of a region covered by the current node.

In an embodiment, the method further includes: obtaining a split mode of the current node. The determining, based on a depth N of the current node, coordinates of an upper-left corner of a region covered by a current quantization group includes: if the depth N of the current node is equal to a third threshold T3 minus 1, and the split mode of the current node is a ternary split mode or a quadtree split mode, determining that the coordinates of the upper-left corner of the region covered by the current quantization group are coordinates of an upper-left corner of a region covered by the current node; or if the depth N of the current node is equal to a third threshold T3, and the split mode of the current node is a binary split mode, determining that the coordinates of the upper-left corner of the region covered by the current quantization group are coordinates of an upper-left corner of a region covered by the current node.

In an embodiment, the depth N of the current node is determined based on a QT depth of the current node and a binary depth Db of the current node.

In an embodiment, the depth N of the current node is determined by using the following calculation formula: $N=Dq*2+Db$, where Dq is the QT depth of the current node.

In an embodiment, if the current node is a multi-type tree MTT root node, the binary depth Db of the current node is 0; or if the current node is an MTT node and is not an MTT root node, and the current node is a child node obtained in the binary split mode, the binary depth Db of the current node is a binary depth of a direct parent node of the current node plus 1; or if the current node is an MTT node and is not an MTT root node, and the current node is a middle child node obtained in the ternary split mode, the binary depth Db of the current node is a binary depth of a direct parent node of the current node plus 1; or if the current node is an MTT node and is not an MTT root node, and the current node is a non-middle child node obtained in the ternary split mode, the binary depth Db of the current node is a binary depth of a direct parent node of the current node plus 2.

In an embodiment, if a QP delta of a first CU having a residual in the current quantization group is not equal to 0, luminance QPs of all CUs whose coding sequences are before that of the first CU having a residual in the current quantization group are modified to a luminance QP of the first CU having a residual. If the current CU is a CU before the first CU having a residual in the current quantization group, the obtaining a reconstructed picture of the current CU based on the QP delta of the current CU is specifically: obtaining the reconstructed picture of the current CU based on the luminance QP of the first CU having a residual.

According to a fourth aspect, an embodiment of the present disclosure provides a video decoder, including: an entropy decoding unit, configured to: parse coding tree split information to obtain a current node, determine, based on a depth N of the current node, coordinates of an upper-left corner of a region covered by a current quantization group, obtain a quantization parameter QP delta of a current coding unit CU that covers the coordinates of the upper-left corner of the region covered by the current quantization group, and determine a luminance QP of the current CU based on the QP delta of the current CU; an inverse quantization unit, configured to obtain a dequantized coefficient of the current CU based on the luminance QP of the current CU; an inverse transform processing unit, configured to obtain a reconstructed residual block of the current CU based on the dequantized coefficient of the current CU; and a reconstruction unit, configured to obtain a reconstructed picture of the current CU based on the reconstructed residual block of the current CU.

In an embodiment, the depth N of the current node is a quadtree depth N of the current node. The entropy decoding unit is specifically configured to: determine, based on the depth N of the current node, the coordinates of the upper-left corner of the region covered by the current quantization group; or determine, based on a multi-type tree depth M of the current node, the coordinates of the upper-left corner of the region covered by the current quantization group. If N is greater than a first threshold T1 or M is greater than 0, the coordinates of the upper-left corner of the region covered by the current quantization group are coordinates of an upper-left corner of a region covered by a $K^{th}$-layer quadtree node of the current node. K is a smaller value between N and T1, and the $K^{th}$-layer quadtree node is a quadtree node that includes the current node and that is generated after K times of quadtree split starting from a coding tree unit CTU.

In an embodiment, the depth N of the current node is a quadtree depth N of the current node. The entropy decoding unit is specifically configured to determine, based on the quadtree depth N of the current node and a multi-type tree depth M of the current node, the coordinates of the upper-left corner of the region covered by the current quantization group. If N is less than or equal to a first threshold T1 and M is equal to 0, the coordinates of the upper-left corner of the region covered by the current quantization group are coordinates of an upper-left corner of a region covered by the current node.

In an embodiment, the depth N of the current node is a quadtree depth N of the current node. The entropy decoding unit is specifically configured to: determine, based on the quadtree depth N of the current node, the coordinates of the upper-left corner of the region covered by the current quantization group, or determine, based on the quadtree depth N of the current node and a multi-type tree depth M of the current node, the coordinates of the upper-left corner of the region covered by the current quantization group. If N is equal to a first threshold T1 and M is equal to 0, the coordinates of the upper-left corner of the region covered by the current quantization group are coordinates of an upper-left corner of a region covered by the current node. Alternatively, if N is less than a first threshold T1, the coordinates of the upper-left corner of the region covered by the current quantization group are coordinates of an upper-left corner of a region covered by the current node.

In an embodiment, the depth N of the current node is a quadtree depth N of the current node. The entropy decoding unit is specifically configured to determine, based on the quadtree depth N of the current node and a multi-type tree depth M of the current node, the coordinates of the upper-left corner of the region covered by the current quantization group. If N is equal to a first threshold T1 and M is equal to 0, the coordinates of the upper-left corner of the region covered by the current quantization group are coordinates of an upper-left corner of a region covered by the current node. Alternatively, if N is less than a first threshold T1 and M is less than or equal to a fourth threshold T4, the coordinates of the upper-left corner of the region covered by the current quantization group are coordinates of an upper-left corner of a region covered by the current node.

In an embodiment, the depth N of the current node is a quadtree depth N of the current node. The entropy decoding unit is specifically configured to determine, based on the quadtree depth N of the current node and a multi-type tree depth M of the current node, the coordinates of the upper-left corner of the region covered by the current quantization group. If N is less than or equal to a first threshold T1 and M is less than or equal to T1−N, the coordinates of the upper-left corner of the region covered by the current quantization group are coordinates of an upper-left corner of a region covered by the current node.

In an embodiment, the entropy decoding unit is specifically configured to: if the depth N of the current node is greater than a first threshold T1, obtain an $(N-T1)^{th}$-layer parent node of the current node; and determine that the coordinates of the upper-left corner of the region covered by the current quantization group are coordinates of an upper-left corner of a region covered by the $(N-T1)^{th}$-layer parent node.

In an embodiment, the entropy decoding unit is specifically configured to: if the depth N of the current node is equal to a first threshold T1, determine that the coordinates of the upper-left corner of the region covered by the current quantization group are coordinates of an upper-left corner of a region covered by the current node.

In an embodiment, the first threshold T1 is a preset nonnegative integer.

In an embodiment, the first threshold T1 is 0, 1, 2, or 3.

In an embodiment, the depth of the current node is the quadtree depth QT depth of the current node.

In an embodiment, the depth of the current node is a sum of the QT depth of the current node and the multi-type tree depth MTT depth of the current node.

In an embodiment, the entropy decoding unit is further configured to: obtain a split mode of the current node; and if the depth N of the current node is equal to a second threshold T2 minus 1, and the split mode of the current node is a ternary split mode, determine that the coordinates of the upper-left corner of the region covered by the current quantization group are coordinates of an upper-left corner of a region covered by the current node; or if the depth N of the current node is equal to a second threshold T2, and the split mode of the current node is a binary split mode or a quadtree split mode, determine that the coordinates of the upper-left corner of the region covered by the current quantization group are coordinates of an upper-left corner of a region covered by the current node.

In an embodiment, the entropy decoding unit is further configured to: obtain a split mode of the current node; and if the depth N of the current node is equal to a third threshold T3 minus 1, and the split mode of the current node is a ternary split mode or a quadtree split mode, determine that the coordinates of the upper-left corner of the region covered by the current quantization group are coordinates of an upper-left corner of a region covered by the current node; or if the depth N of the current node is equal to a third threshold T3, and the split mode of the current node is a binary split mode, determine that the coordinates of the upper-left corner of the region covered by the current quantization group are coordinates of an upper-left corner of a region covered by the current node.

In an embodiment, the entropy decoding unit is specifically configured to determine the depth N of the current node based on a QT depth of the current node and a binary depth Db of the current node.

In an embodiment, the entropy decoding unit is specifically configured to determine the depth N of the current node by using the following calculation formula: $N=Dq*2+Db$, where Dq is the QT depth of the current node.

In an embodiment, if the current node is a multi-type tree MTT split node, the binary depth Db of the current node is 0; or if the current node is an MTT node and is not an MTT root node, and the current node is a child node obtained in the binary split mode, the binary depth Db of the current node is a binary depth of a direct parent node of the current node plus 1; or if the current node is an MTT node and is not an MTT root node, and the current node is a middle child node obtained in the ternary split mode, the binary depth Db of the current node is a binary depth of a direct parent node of the current node plus 1; or if the current node is an MTT node and is not an MTT root node, and the current node is a non-middle child node obtained in the ternary split mode, the binary depth Db of the current node is a binary depth of a direct parent node of the current node plus 2.

In an embodiment, the entropy decoding unit is further configured to: if a QP delta of a first CU having a residual in the current quantization group is not equal to 0, modify luminance QPs of all CUs whose coding sequences are before that of the first CU having a residual in the current quantization group to a luminance QP of the first CU having a residual. If the current CU is a CU before the first CU having a residual in the current quantization group, the inverse quantization unit is specifically configured to obtain the dequantized coefficient of the current CU based on the luminance QP of the first CU having a residual.

According to a fifth aspect, the present disclosure relates to a video stream decoding apparatus, including a processor and a memory. The memory stores an instruction, and the instruction enables the processor to perform the method according to the first aspect or the third aspect or any possible embodiment of the first aspect or the third aspect.

According to a sixth aspect, a computer-readable storage medium is provided. The computer-readable storage medium stores an instruction, and when the instruction is executed, one or more processors are enabled to encode video data. The instruction enables the one or more processors to perform the method according to the first aspect or the third aspect or any possible embodiment of the first aspect or the third aspect.

According to a seventh aspect, the present disclosure relates to a computer program including program code. When the program code is run on a computer, the method according to the first aspect or the third aspect or any possible embodiment of the first aspect or the third aspect is performed.

Details of one or more embodiments are described in accompanying drawings and the following descriptions. Other features, objects, and advantages are apparent from the specification, drawings, and claims.

BRIEF DESCRIPTION OF DRAWINGS

To describe the technical solutions in the embodiments of this application or in the background more clearly, the following describes the accompanying drawings for describing the embodiments of this application or the background.

Figure 1:
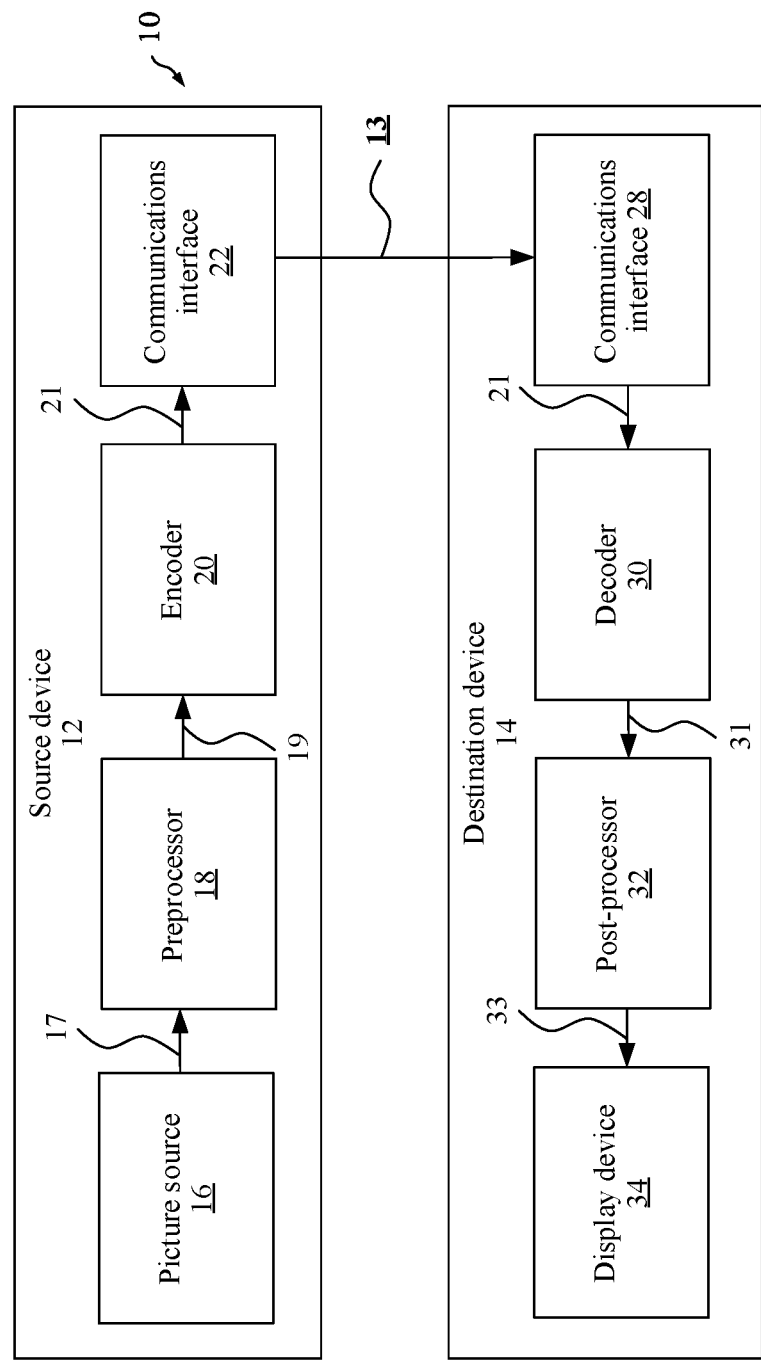
FIG. 1 is a block diagram of an example of a video coding system use to implement an embodiment of the present disclosure.

In the following, identical reference signs represent identical or at least functionally equivalent features unless otherwise specified.

DESCRIPTION OF EMBODIMENTS

In the following description, reference is made to the accompanying drawings that form a part of this disclosure and show, by way of illustration, specific aspects of the embodiments of the present disclosure or specific aspects in which the embodiments of the present disclosure may be used. It should be understood that the embodiments of the present disclosure may be used in another aspect, and may include structural or logical changes not depicted in the accompanying drawings. Therefore, the following detailed description shall not be taken in a limiting sense, and the scope of the present disclosure is defined by the appended claims.

For example, it should be understood that a disclosure in connection with a described method may also hold true for a corresponding device or system configured to perform the method and vice versa. For example, if one or more specific method operations are described, a corresponding device may include one or more units such as functional units, to perform the described one or more method operations (for example, one unit performing the one or more operations; or a plurality of units each performing one or more of the plurality of operations), even if such one or more units are not explicitly described or illustrated in the accompanying drawings. On the other hand, for example, if a specific apparatus is described based on one or more units such as functional units, a corresponding method may include one operation used to perform functionality of the one or more units (for example, one operation used to perform the functionality of the one or more units, or a plurality of operations each used to perform functionality of one or more of a plurality of units), even if such one or more operations are not explicitly described or illustrated in the accompanying drawings. Further, it should be understood that features of the various example embodiments and/or aspects described in this specification may be combined with each other, unless specifically noted otherwise.

Video coding usually refers to processing a sequence of pictures that constitute a video or a video sequence. In the field of video coding, the terms "picture", "frame", and "image" may be used as synonyms. Video coding used in this application (or this disclosure) indicates either video encoding or video decoding. Video encoding is performed on a source side, and usually includes processing (for example, by compressing) an original video picture to reduce an amount of data for representing the video picture (for more efficient storage and/or transmission). Video decoding is performed on a destination side, and usually includes inverse processing relative to an encoder to reconstruct the video picture. "Coding" of a video picture (or collectively referred to as a picture, which is explained below) in the embodiments should be understood as "encoding" or "decoding" of a video sequence. A combination of an encoding part and a decoding part is also referred to as CODEC (encoding and decoding).

In a case of lossless video coding, an original video picture may be reconstructed. In other words, a reconstructed video picture has same quality as the original video picture (assuming that no transmission loss or other data loss occurs during storage or transmission). In a case of lossy video coding, further compression is performed through, for example, quantization, to reduce an amount of data required for representing a video picture, and the video picture cannot be perfectly reconstructed on a decoder side. In other words, quality of a reconstructed video picture is lower or poorer than that of the original video picture.

Several H.261 video coding standards are used for "lossy hybrid video coding" (to be specific, spatial and temporal prediction in a sample domain is combined with 2D transform coding for applying quantization in a transform domain). Each picture of a video sequence is typically partitioned into a set of non-overlapping blocks, and coding is typically performed at a block level. To be specific, at an encoder side, a video is usually processed, that is, encoded, at a block (video block) level. For example, a prediction block is generated through spatial (intra-picture) prediction and temporal (inter-picture) prediction, the prediction block is subtracted from a current block (block being processed or to be processed) to obtain a residual block, and the residual block is transformed in the transform domain and quantized to reduce an amount of data that is to be transmitted (compressed). At the decoder side, an inverse processing part relative to the encoder is applied to an encoded block or a compressed block to reconstruct the current block for representation. Furthermore, the encoder duplicates a decoder processing loop, so that the encoder and the decoder generate a same prediction (for example, an intra prediction and an inter prediction) and/or reconstruction, for processing, that is, for coding subsequent blocks.

As used in this specification, the term "block" may be a part of a picture or a frame. For convenience of description, the embodiments of the present disclosure are described herein with reference to versatile video coding (VVC) or high efficiency video coding (HEVC) developed by the joint collaboration team on video coding (JCT-VC) of ITU-T video coding experts group (VCEG) and ISO/IEC motion picture experts group (MPEG). A person of ordinary skill in the art understands that the embodiments of the present disclosure are not limited to HEVC or VVC. The block may be a CU, a PU, or a TU. In HEVC, a CTU is split into a plurality of CUs by using a quadtree structure represented as a coding tree. A decision on whether to encode a picture region through inter-picture (temporal) or intra-picture (spatial) prediction is made at a CU level. Each CU may be further split into one, two, or four PUs based on a PU splitting pattern. Inside one PU, a same prediction process is applied, and related information is transmitted to the decoder on a PU basis. After obtaining a residual block by applying the prediction process based on the PU splitting pattern, the CU may be partitioned into transform units (TU) based on another quadtree structure similar to the coding tree used for the CU. In the recent development of video compression technologies, a quadtree plus binary tree (QTBT) partition frame is used to partition a coding block. In a QTBT block structure, the CU may be square or rectangular. In the VVC, a coding tree unit (CTU) is first partitioned by using a quadtree structure. A leaf node of a quadtree is further partitioned by using a binary tree structure. A leaf node of a binary tree is referred to as a coding unit (CU), and the CU is used for prediction and transform processing without any further partition. This means that the CU, PU and TU have a same block size in the QTBT coding block structure. In addition, multiply partition, such as triple tree partition, is proposed to be used in combination with the QTBT block structure.

Figure 9:
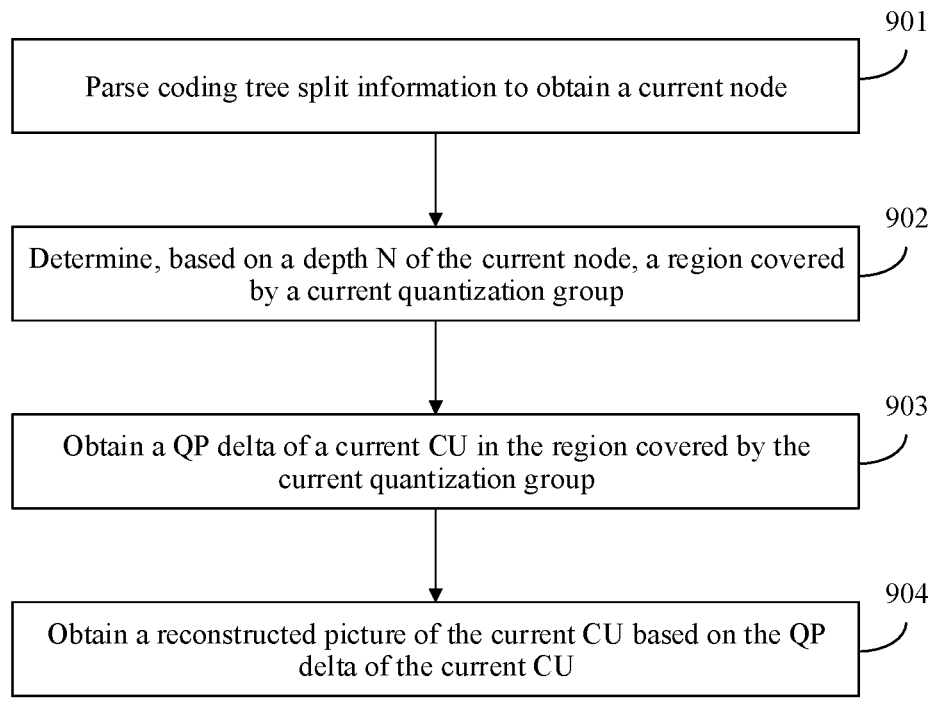
FIG. 9 is a flowchart illustrating a video decoding method according to an embodiment.

The following describes embodiments of an encoder 20, a decoder 30, and coding systems 10 and 40 based on FIG. 1 to FIG. 4 (before the embodiments of the present disclosure are described in more detail based on FIG. 9).

FIG. 1 is a conceptual or schematic block diagram of an example coding system 10, for example, a video coding system 10 that may use a technology of this application. An encoder 20 (for example, a video encoder 20) and a decoder 30 (for example, a video decoder 30) of the video coding system 10 represent example devices that may be configured to perform, based on various examples described in this application, a technology used for . . . (partition/intra prediction/ . . . ). As shown in FIG. 1, the coding system 10 includes a source device 12 configured to provide encoded data 13 such as an encoded picture 13 to, for example, a destination device 14 that decodes the encoded data 13.

The source device 12 includes an encoder 20, and optionally, may include a picture source 16, for example, a preprocessing unit 18 of a picture preprocessing unit 18, and a communications interface or communications unit 22.

The picture source 16 may include or be any type of picture capture device configured to, for example, capture a real-world picture; and/or any type of device for generating a picture or comment (for screen content encoding, some text on a screen is also considered as a part of a to-be-encoded picture or image), for example, a computer graphics processor configured to generate a computer animation picture; or any type of device configured to obtain and/or provide a real-world picture or a computer animation picture (for example, screen content or a virtual reality (VR) picture); and/or any combination thereof (for example, an augmented reality (AR) picture).

A (digital) picture is or can be considered as a two-dimensional array or matrix of samples with intensity values. A sample in the array may also be referred to as a pixel (short for picture element) or a pel. A quantity of samples in horizontal and vertical directions (or axes) of the array or the picture defines a size and/or resolution of the picture. For representation of color, three color components are usually employed, to be specific, the picture may be represented as or include three sample arrays. In an RBG format or a color space, a picture includes corresponding red, green, and blue sample arrays. However, in video coding, each pixel is usually represented in a luminance/chrominance format or a color space, for example, YCbCr, which includes a luminance component indicated by Y (sometimes indicated by L alternatively) and two chrominance components indicated by Cb and Cr. The luminance (luma for short) component Y represents brightness or gray level intensity (for example, both are the same in a gray-scale picture), and the two chrominance (chroma for short) components Cb and Cr represent chrominance or color information components. Correspondingly, a picture in an YCbCr format includes a luminance sample array of luminance sample values (Y), and two chrominance sample arrays of chrominance values (Cb and Cr). A picture in an RGB format may be transformed or converted into a YCbCr format and vice versa. This process is also referred to as color conversion or transform. If a picture is monochrome, the picture may include only a luminance sample array.

The picture source 16 (for example, a video source 16) may be, for example, a camera for capturing a picture, or a memory such as a picture memory, including or storing a previously captured or generated picture, and/or any type of interface (internal or external) for obtaining or receiving a picture. The camera may be, for example, a local camera, or an integrated camera integrated in the source device, and the memory may be a local memory or, for example, an integrated memory integrated in the source device. The interface may be, for example, an external interface to receive a picture from an external video source. The external video source is, for example, an external picture capturing device such as a camera, an external memory, or an external picture generating device. The external picture generating device is, for example, an external computer graphics processor, a computer or a server. The interface may be any type of interface, for example, a wired or wireless interface or an optical interface, according to any proprietary or standardized interface protocol. An interface for obtaining picture data 17 may be a same interface as or a part of the communications interface 22.

Different from the preprocessing unit 18 and processing performed by the preprocessing unit 18, the picture or picture data 17 (for example, video data 16) may also be referred to as a raw picture or raw picture data 17.

The preprocessing unit 18 is configured to receive the (raw) picture data 17 and perform preprocessing on the picture data 17 to obtain a preprocessed picture 19 or preprocessed picture data 19. For example, the preprocessing performed by the preprocessing unit 18 may include trimming, color format conversion (for example, from RGB to YCbCr), color correction, or denoising. It may be understood that the preprocessing unit 18 may be an optional component.

The encoder 20 (for example, the video encoder 20) is configured to receive the preprocessed picture data 19 and provide encoded picture data 21 (details are further described below, for example, based on FIG. 2 or FIG. 4).

The communications interface 22 of the source device 12 may be configured to receive the encoded picture data 21 and transmit the encoded picture data 21 to another device, for example, the destination device 14 or any other device, for storage or direct reconstruction. Alternatively, the communications interface 22 is configured to process the encoded picture data 21 before correspondingly storing encoded data 13 and/or transmitting the encoded data 13 to another device. The another device is, for example, the destination device 14 or any other device used for decoding or storage.

The destination device 14 includes the decoder 30 (for example, the video decoder 30), and optionally may include a communications interface or communications unit 28, a post-processing unit 32 and a display device 34.

The communications interface 28 of the destination device 14 is configured to, for example, receive the encoded picture data 21 or the encoded data 13 directly from the source device 12 or any other source. The any other source is, for example, a storage device. The storage device is, for example, an encoded picture data storage device.

The communications interface 22 and the communications interface 28 may be configured to transmit or receive the encoded picture data 21 or the encoded data 13 through a direct communication link between the source device 12 and the destination device 14 or through any type of network. The direct communication link is, for example, a direct wired or wireless connection. The any type of network is, for example, a wired or wireless network or any combination thereof, or any type of private or public network, or any combination thereof.

The communications interface 22 may be, for example, configured to package the encoded picture data 21 into an appropriate format, for example, a packet, for transmission over a communications link or communications network.

The communications interface 28 forming a corresponding part of the communications interface 22 may be, for example, configured to de-package the encoded data 13, to obtain the encoded picture data 21.

Both the communications interface 22 and the communications interface 28 may be configured as unidirectional communications interfaces, as indicated by an arrow that points from the source device 12 to the destination device 14 and that is used for the encoded picture data 21 in FIG. 1, or may be configured as bidirectional communications interfaces, and may be configured to, for example, send and receive messages to establish a connection, and acknowledge and exchange any other information related to a communication link and/or data transmission such as encoded picture data transmission.

The decoder 30 is configured to receive the encoded picture data 21 and provide decoded picture data 31 or a decoded picture 31 (details are further described below, for example, based on FIG. 3 or FIG. 5).

The post-processor 32 of the destination device 14 is configured to post-process the decoded picture data 31 (also referred to as reconstructed picture data), for example, the decoded picture 131, to obtain post-processed picture data 33, for example, a post-processed picture 33. The post-processing performed by the post-processing unit 32 may include, for example, color format conversion (for example, from YCbCr to RGB), color correction, trimming, or re-sampling, or any other processing to, for example, prepare the decoded picture data 31 for display by, for example, the display device 34.

The display device 34 of the destination device 14 is configured to receive the post-processed picture data 33 to display a picture, for example, to a user or a viewer. The display device 34 may be or include any type of display for presenting a reconstructed picture, for example, an integrated or external display or monitor. For example, the display may include a liquid crystal display (LCD), an organic light emitting diode (OLED) display, a plasma display, a projector, a micro LED display, a liquid crystal on silicon (liquid crystal on silicon, LCoS), a digital light processor (DLP), or any type of other display.

Although FIG. 1 depicts the source device 12 and the destination device 14 as separate devices, a device embodiment may alternatively include both the source device 12 and the destination device 14 or functionalities of both the source device 12 and the destination device 14, that is, the source device 12 or the corresponding functionality and the destination device 14 or the corresponding functionality. In such an embodiment, the source device 12 or the corresponding functionality and the destination device 14 or the corresponding functionality may be implemented by using same hardware and/or software, separate hardware and/or software, or any combination thereof.

As will be apparent for a person skilled in the art based on the descriptions, existence and (exact) division of functionalities of different units or the functionalities of the source device 12 and/or the destination device 14 shown in FIG. 1 may vary depending on an actual device and application.

The encoder 20 (for example, the video encoder 20) and the decoder 30 (for example, the video decoder 30) each may be implemented as any one of various suitable circuits, for example, one or more microprocessors, digital signal processors (DSP), application-specific integrated circuits (ASIC), field-programmable gate arrays (FPGA), discrete logic, hardware, or any combinations thereof. If the technologies are implemented partially by using software, a device may store a software instruction in a suitable non-transitory computer-readable storage medium and may execute the instruction by using hardware such as one or more processors, to perform the technologies of this disclosure. Any of the foregoing content (including hardware, software, a combination of hardware and software, and the like) may be considered as one or more processors. The video encoder 20 and the video decoder 30 each may be included in one or more encoders or decoders, and the encoder or the decoder may be integrated as a part of a combined encoder/decoder (codec) in a corresponding device.

The source device 12 may be referred to as a video encoding device or a video encoding apparatus. The destination device 14 may be referred to as a video decoding device or a video decoding apparatus. The source device 12 and the destination device 14 may be an example of a video coding device or a video coding apparatus.

The source device 12 and the destination device 14 may include any one of a wide range of devices, including any type of handheld or stationary device, for example, a notebook or laptop computer, a mobile phone, a smartphone, a tablet or tablet computer, a video camera, a desktop computer, a set-top box, a television, a display device, a digital media player, a video game console, a video streaming device (such as a content service server or a content delivery server), a broadcast receiver device, or a broadcast transmitter device, and may use or not use any type of operating system.

In some cases, the source device 12 and the destination device 14 may be equipped for wireless communication. Therefore, the source device 12 and the destination device 14 may be wireless communications devices.

In some cases, the video coding system 10 shown in FIG. 1 is merely an example, and the technologies of this application may be applicable to video coding settings (for example, video encoding or video decoding) that do not necessarily include any data communication between an encoding device and a decoding device. In another example, data may be retrieved from a local memory, streamed over a network, or the like. A video encoding device may encode the data and store the data into the memory, and/or a video decoding device may retrieve data from the memory and decode the data. In some examples, encoding and decoding are performed by devices that do not communicate with each other but simply encode data to the memory and/or retrieve data from the memory and decode the data.

It should be understood that for each of the examples described with reference to the video encoder 20, the video decoder 30 may be configured to perform a reverse process. With regard to a signaling syntax element, the video decoder 30 may be configured to receive and parse such a syntax element and correspondingly decode related video data. In some examples, the video encoder 20 may entropy encode one or more syntax elements that define . . . into an encoded video bitstream. In such examples, the video decoder 30 may parse such syntax element and correspondingly decode related video data.

Encoder & Encoding Method

Figure 2:
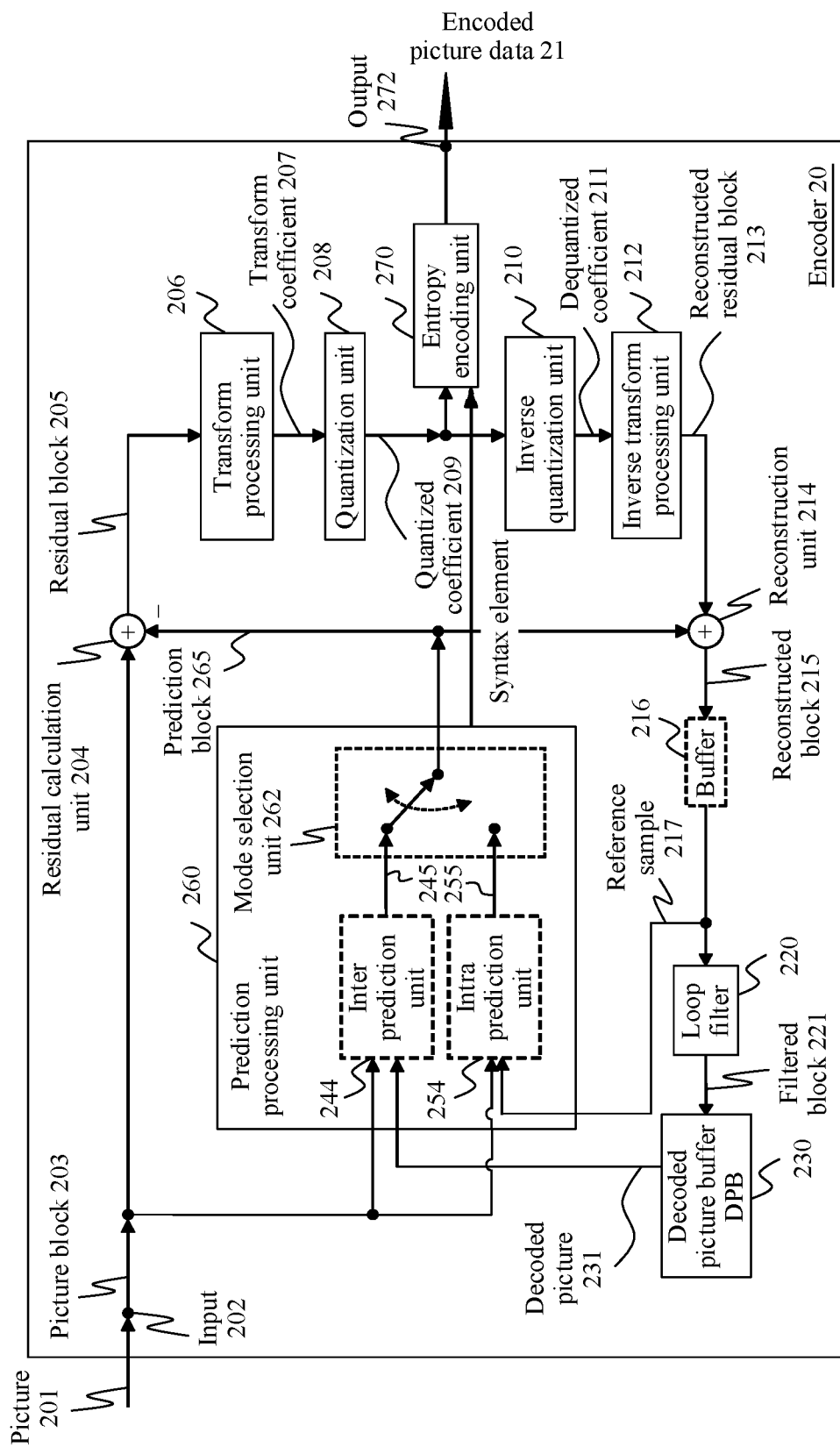
FIG. 2 is a block diagram showing an example structure of a video encoder used to implement an embodiment of the present disclosure.

FIG. 2 is a schematic/conceptual block diagram of an example of a video encoder 20 configured to implement the technologies of this application (disclosure). In the example of FIG. 2, the video encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The video encoder 20 shown in FIG. 2 may also be referred to as a hybrid video encoder or a video encoder based on a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and the prediction processing unit 260 form a backward signal path of the encoder. The backward signal path of the encoder corresponds to a signal path of a decoder (refer to a decoder 30 in FIG. 3).

The encoder 20 receives, for example, through an input 202, a picture 201 or a block 203 of the picture 201, for example, a picture in a sequence of pictures forming a video or a video sequence. The picture block 203 may also be referred to as a current picture block or a to-be-encoded picture block. The picture 201 may be referred to as a current picture or a to-be-encoded picture (particularly in video coding, to distinguish the current picture from other pictures, the other pictures are, for example, previously encoded and/or decoded pictures in a same video sequence, that is, the video sequence that also includes the current picture).

Partitioning

An embodiment of the encoder 20 may include a partitioning unit (not shown in FIG. 2), configured to partition the picture 201 into a plurality of blocks such as the block 203. The picture 201 is usually partitioned into a plurality of non-overlapping blocks. The partitioning unit may be configured to use a same block size for all pictures in a video sequence and a corresponding grid defining the block size, or change a block size between pictures or subsets or groups of pictures, and partition each picture into corresponding blocks.

In an example, the prediction processing unit 260 of the video encoder 20 may be configured to perform any combination of the partitioning technologies described above.

Like the picture 201, the block 203 is also or may be considered as a two-dimensional array or matrix of samples with luminance values (sample values), although a size of the block 203 is smaller than a size of the picture 201. In other words, the block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. A quantity of samples in horizontal and vertical directions (or axes) of the block 203 defines a size of the block 203.

The encoder 20 shown in FIG. 2 is configured to encode the picture 201 block by block, for example, perform encoding and prediction on each block 203.

Residual Calculation

The residual calculation unit 204 is configured to calculate a residual block 205 based on the picture block 203 and a prediction block 265 (details about the prediction block 265 are further provided below), for example, by subtracting sample values of the prediction block 265 from sample values of the picture block 203 sample by sample (pixel by pixel), to obtain the residual block 205 in a sample domain.

Transform

The transform processing unit 206 is configured to apply a transform, for example, a discrete cosine transform (DCT) or a discrete sine transform (DST), to sample values of the residual block 205 to obtain transform coefficients 207 in a transform domain. The transform coefficient 207 may also be referred to as a transform residual coefficient and represents the residual block 205 in the transform domain.

The transform processing unit 206 may be configured to apply integer approximations of DCT/DST, such as transforms specified in HEVC/H.265. Compared with an orthogonal DCT transform, such integer approximations are usually scaled based on a factor. To preserve a norm of a residual block which is processed by using forward and inverse transforms, an additional scale factor is applied as a part of the transform process. The scale factor is usually selected based on some constraints, for example, the scale factor being a power of two for a shift operation, a bit depth of the transform coefficient, and a tradeoff between accuracy and implementation costs. For example, a specific scale factor is specified for the inverse transform by, for example, the inverse transform processing unit 212 at a decoder 30 side (and a corresponding inverse transform by, for example, the inverse transform processing unit 212 at an encoder 20 side), and correspondingly, a corresponding scale factor may be specified for the forward transform by the transform processing unit 206 at the encoder 20 side.

Quantization

The quantization unit 208 is configured to quantize the transform coefficients 207 to obtain quantized transform coefficients 209, for example, by applying scalar quantization or vector quantization. The quantized transform coefficient 209 may also be referred to as a quantized residual coefficient 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scales may be applied to achieve finer or coarser quantization. A smaller quantization step corresponds to finer quantization, and a larger quantization step corresponds to coarser quantization. An appropriate quantization step may be indicated by a quantization parameter (QP). For example, the quantization parameter may be an index to a predefined set of appropriate quantization steps. For example, a smaller quantization parameter may correspond to the finer quantization (the smaller quantization step) and a larger quantization parameter may correspond to the coarser quantization (the larger quantization step), or vice versa. The quantization may include division by a quantization step and corresponding quantization or inverse quantization, for example, performed by the inverse quantization unit 210, or may include multiplication by a quantization step. In embodiments according to some standards such as HEVC, a quantization parameter may be used to determine the quantization step. Generally, the quantization step may be calculated based on a quantization parameter by using a fixed point approximation of an equation including division. Additional scale factors may be introduced for quantization and dequantization to restore the norm of the residual block, where the norm of the residual block may be modified because of a scale used in the fixed point approximation of the equation for the quantization step and the quantization parameter. In an example implementation, a scale of the inverse transform may be combined with a scale of the dequantization. Alternatively, a customized quantization table may be used and signaled from the encoder to the decoder, for example, in a bitstream. The quantization is a lossy operation, where a larger quantization step indicates a larger loss.

The inverse quantization unit 210 is configured to apply the inverse quantization of the quantization unit 208 to a quantized coefficient to obtain a dequantized coefficient 211, for example, apply, based on or by using a same quantization step as the quantization unit 208, the inverse of a quantization scheme applied by the quantization unit 208. The dequantized coefficient 211 may also be referred to as a dequantized residual coefficient 211, and correspond to the transform coefficient 207, although the dequantized coefficient 211 is usually different from the transform coefficient due to a loss caused by quantization.

The inverse transform processing unit 212 is configured to apply an inverse transform of the transform applied by the transform processing unit 206, for example, an inverse discrete cosine transform (DCT) or an inverse discrete sine transform (DST), to obtain an inverse transform block 213 in the sample domain. The inverse transform block 213 may also be referred to as an inverse transform dequantized block 213 or an inverse transform residual block 213.

The reconstruction unit 214 (for example, a summator 214) is configured to add the inverse transform block 213 (that is, the reconstructed residual block 213) to the prediction block 265, for example, by adding sample values of the reconstructed residual block 213 and the sample values of the prediction block 265, to obtain a reconstructed block 215 in the sample domain.

Optionally, a buffer unit 216 ("buffer" 216 for short) of, for example, the line buffer 216, is configured to buffer or store the reconstructed block 215 and a corresponding sample value, for example, for intra prediction. In other embodiments, the encoder may be configured to use an unfiltered reconstructed block and/or a corresponding sample value that are/is stored in the buffer unit 216, for any type of estimation and/or prediction, for example, intra prediction.

For example, in an embodiment, the encoder 20 may be configured so that the buffer unit 216 is configured to store the reconstructed block 215 not only used for intra prediction 254 but also used for the loop filter unit 220 (not shown in FIG. 2), and/or so that, for example, the buffer unit 216 and the decoded picture buffer 230 form one buffer. In other embodiments, a filtered block 221 and/or a block or a sample from the decoded picture buffer 230 (the block or sample is not shown in FIG. 2) are/is used as an input or a basis for the intra prediction unit 254.

The loop filter unit 220 ("loop filter" 220 for short) is configured to filter the reconstructed block 215 to obtain a filtered block 221, to smooth pixel transitions or improve video quality. The loop filter unit 220 is intended to represent one or more loop filters such as a deblocking filter, a sample-adaptive offset (SAO) filter, or another filter, for example, a bilateral filter, an adaptive loop filter (ALF), a sharpening or smoothing filter, or a collaborative filter. Although the loop filter unit 220 is shown as an in-loop filter in FIG. 2, in another implementation, the loop filter unit 220 may be implemented as a post-loop filter. The filtered block 221 may also be referred to as a filtered reconstructed block 221. The decoded picture buffer 230 may store a reconstructed encoded block after the loop filter unit 220 performs a filtering operation on the reconstructed encoded block.

In an embodiment, the encoder 20 (correspondingly, the loop filter unit 220) may be configured to output a loop filter parameter (for example, sample adaptive offset information), for example, directly or after entropy encoding performed by the entropy encoding unit 270 or any other entropy encoding unit, so that, for example, the decoder 30 can receive and apply the same loop filter parameter for decoding.

The decoded picture buffer (DPB) 230 may be a reference picture memory that stores reference picture data for use in video data encoding by the video encoder 20. The DPB 230 may be formed by any one of a variety of memory devices such as a dynamic random access memory (DRAM) (including a synchronous DRAM (SDRAM), a magnetoresistive RAM (MRAM), a resistive RAM (RRAM)), or another type of memory device. The DPB 230 and the buffer 216 may be provided by a same memory device or separate memory devices. In an example, the decoded picture buffer (DPB) 230 is configured to store the filtered block 221. The decoded picture buffer 230 may further be configured to store another previously filtered block, for example, a previously reconstructed and filtered block 221, of the same current picture or of a different picture, for example, a previously reconstructed picture, and may provide a complete previously reconstructed, that is, decoded picture (and a corresponding reference block and sample) and/or a partially reconstructed current picture (and a corresponding reference block and sample), for example, for inter prediction. In an example, if the reconstructed block 215 is reconstructed without in-loop filtering, the decoded picture buffer (DPB) 230 is configured to store the reconstructed block 215.

The prediction processing unit 260, also referred to as a block prediction processing unit 260, is configured to receive or obtain the block 203 (a current block 203 of the current picture 201) and reconstructed picture data, for example, reference samples of the same (current) picture from the buffer 216 and/or reference picture data 231 of one or more previously decoded pictures from the decoded picture buffer 230, and process such data for prediction, to be specific, to provide the prediction block 265 that may be an inter prediction block 245 or an intra prediction block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In an embodiment, the mode selection unit 262 may be configured to select the prediction mode (for example, from prediction modes supported by the prediction processing unit 260), where the prediction mode provides a best match or a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (RDO), to be specific, select a prediction mode that provides minimum rate-distortion optimization or select a prediction mode for which related rate distortion at least satisfies a prediction mode selection criterion.

The following describes in detail prediction processing performed (for example, by the prediction processing unit 260) and mode selection performed (for example, by the mode selection unit 262) by an example of the encoder 20.

As described above, the encoder 20 is configured to determine or select an optimal or optimum prediction mode from a set of (pre-determined) prediction modes. The set of prediction modes may include, for example, an intra prediction mode and/or an inter prediction mode.

A set of intra prediction modes may include 35 different intra prediction modes, for example, non-directional modes such as a DC (or average) mode and a planar mode, or directional modes such as those defined in H.265, or may include 67 different intra prediction modes, for example, non-directional modes such as a DC (or average) mode and a planar mode, or directional modes such as those defined in H.266 under development.

A (possible) set of inter prediction modes depends on available reference pictures (namely, for example, at least some decoded pictures stored in the DPB 230, as described above) and other inter prediction parameters, for example, depends on whether an entire reference picture or only a part of the reference picture, for example, a search window region around a region of the current picture block, is used to search for a best matching reference block, and/or for example, depends on whether pixel interpolation such as half-pel and/or quarter-pel interpolation is applied.

In addition to the foregoing prediction modes, a skip mode and/or a direct mode may also be applied.

The prediction processing unit 260 may further be configured to partition the block 203 into smaller block partitions or subblocks, for example, by iteratively using quadtree (QT) partitioning, binary tree (BT) partitioning, triple tree (triple-tree or ternary-tree, TT) partitioning, or any combination thereof, and perform, for example, prediction on each of the block partitions or subblocks. Mode selection includes selection of a tree structure of the partitioned block 203 and selection of a prediction mode applied to each of the block partitions or subblocks.

The inter prediction unit 244 may include a motion estimation (ME) unit (not shown in FIG. 2) and a motion compensation (MC) unit (not shown in FIG. 2). The motion estimation unit is configured to receive or obtain the picture block 203 (the current picture block 203 of the current picture 201) and a decoded picture 231, or at least one or more previously reconstructed blocks, for example, one or more reconstructed blocks of other/different previously decoded pictures 231, for motion estimation. For example, a video sequence may include the current picture and a previously decoded picture 31, or in other words, the current picture and the previously decoded picture 31 may be a part of or form a sequence of pictures forming the video sequence.

For example, the encoder 20 may be configured to select a reference block from a plurality of reference blocks of a same picture or different pictures of a plurality of other pictures, and provide a reference picture (or a reference picture index) and/or an offset (a spatial offset) between a location (X, Y coordinates) of the reference block and a location of the current block as inter prediction parameters to the motion estimation unit (not shown in FIG. 2). The offset is also referred to as a motion vector (MV).

The motion compensation unit is configured to obtain, for example, receive the inter prediction parameter, and perform inter prediction based on or by using the inter prediction parameter, to obtain the inter prediction block 245. Motion compensation performed by the motion compensation unit (not shown in FIG. 2) may include fetching or generating the prediction block based on a motion/block vector determined through motion estimation (possibly performing interpolation in sub-pixel precision). Interpolation filtering may generate an additional pixel sample from a known pixel sample, thereby potentially increasing a quantity of candidate prediction blocks that may be used to code a picture block. Upon receiving a motion vector for a PU of the current picture block, a motion compensation unit 246 may locate a prediction block to which the motion vector points in one of the reference picture lists. The motion compensation unit 246 may also generate a syntax element associated with a block and a video slice, so that the video decoder 30 uses the syntax element to decode the picture block of the video slice.

The intra prediction unit 254 is configured to obtain, for example, receive, a picture block 203 (the current picture block) and one or more previously reconstructed blocks, for example, reconstructed neighboring blocks, of a same picture for intra estimation. For example, the encoder 20 may be configured to select an intra prediction mode from a plurality of (predetermined) intra prediction modes.

In an embodiment, the encoder 20 may be configured to select the intra prediction mode according to an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on, for example, an intra prediction parameter in the selected intra prediction mode. In any case, after selecting an intra-prediction mode for a block, the intra prediction unit 254 is further configured to provide an intra prediction parameter, namely, information indicating the selected intra-prediction mode for the block, to the entropy encoding unit 270. In an example, the intra prediction unit 254 may be configured to perform any combination of intra prediction technologies described below.

The entropy encoding unit 270 is configured to apply (or avoid applying) an entropy encoding algorithm or scheme (for example, a variable length coding (VLC) scheme, a context adaptive VLC (CAVLC) scheme, an arithmetic coding scheme, context adaptive binary arithmetic coding (CABAC), syntax-based context-adaptive binary arithmetic coding (SBAC), probability interval partitioning entropy (PIPE) coding, or another entropy coding methodology or technique) on one or all of the following: the quantized coefficient 209, the inter prediction parameter, the intra prediction parameter, and/or the loop filter parameter, to obtain the encoded picture data 21 that may be output through an output 272, for example, in a form of an encoded bitstream 21. The encoded bitstream may be transmitted to the video decoder 30, or archived for later transmission or retrieval by the video decoder 30. The entropy encoding unit 270 may further be configured to entropy encode another syntax element for a current video slice that is being encoded.

Another structural variant of the video encoder 20 can be used to encode a video stream. For example, a non-transform based encoder 20 may directly quantize a residual signal without the transform processing unit 206 for some blocks or frames. In another implementation, the encoder 20 may have the quantization unit 208 and the inverse quantization unit 210 that are combined into a single unit.

Figure 3:
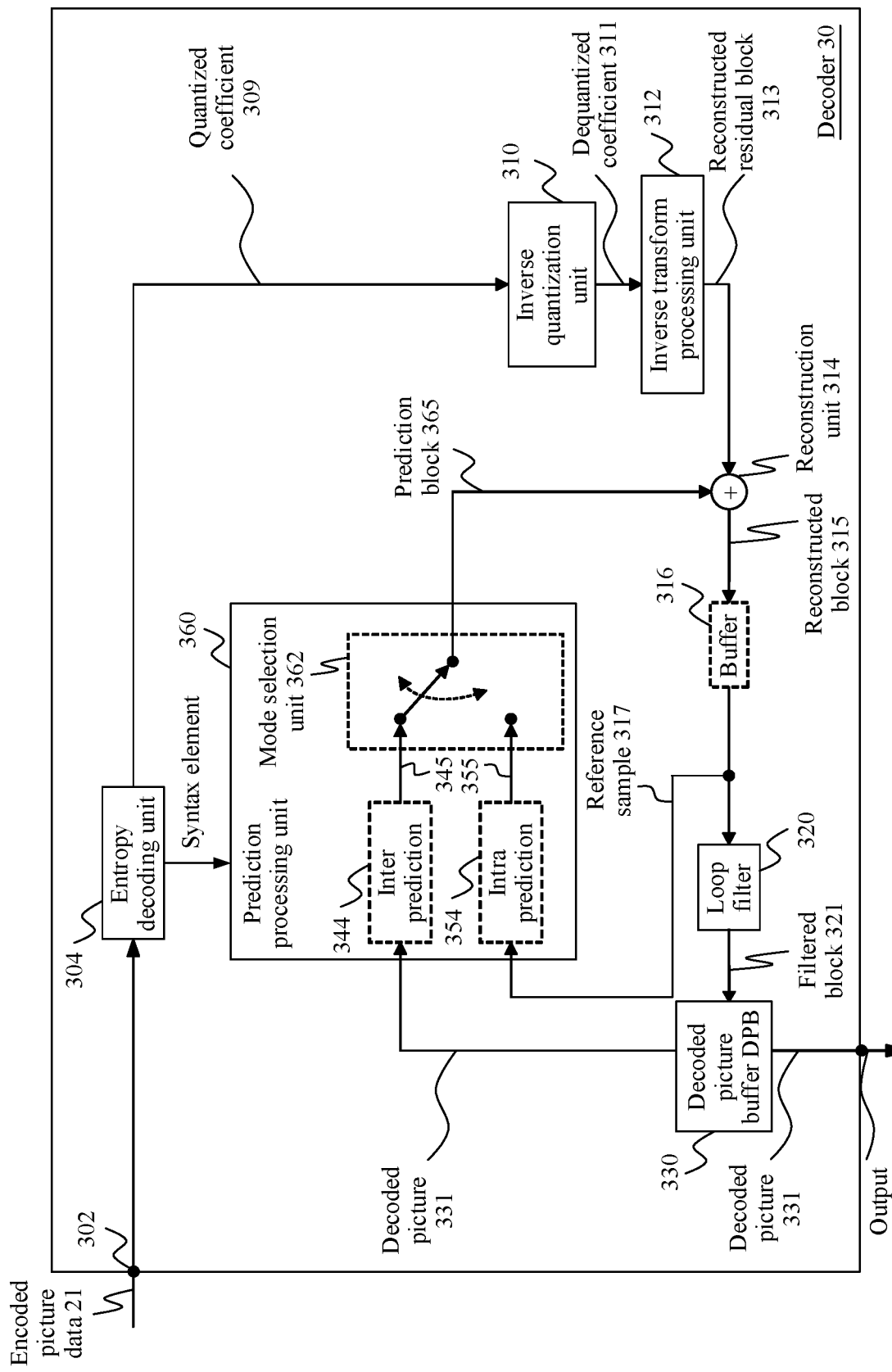
FIG. 3 is a block diagram showing an example structure of a video decoder used to implement an embodiment of the present disclosure.

FIG. 3 shows an example video decoder 30, configured to implement the technologies of this application. The video decoder 30 is configured to receive encoded picture data (for example, an encoded bitstream) 21 encoded by, for example, the encoder 20, to obtain a decoded picture 231. In a decoding process, the video decoder 30 receives video data from the video encoder 20, for example, an encoded video bitstream that represents a picture block of an encoded video slice and an associated syntax element.

In the example of FIG. 3, the decoder 30 includes an entropy decoding unit 304, an inverse quantization unit 310, an inverse transform processing unit 312, a reconstruction unit 314 (for example, a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding pass generally reciprocal to the encoding pass described with reference to the video encoder 20 in FIG. 2.

The entropy decoding unit 304 is configured to perform entropy decoding on the encoded picture data 21 to obtain, for example, a quantized coefficient 309 and/or a decoded encoding parameter (not shown in FIG. 3), for example, any one or all of an inter prediction parameter, an intra prediction parameter, a loop filter parameter, and/or another syntax element (that are decoded). The entropy decoding unit 304 is further configured to forward the inter prediction parameter, the intra prediction parameter, and/or the another syntax element to the prediction processing unit 360. The video decoder 30 may receive syntax elements at a video slice level and/or a video block level.

The inverse quantization unit 310 may have a same function as the inverse quantization unit 110. The inverse transform processing unit 312 may have a same function as the inverse transform processing unit 212. The reconstruction unit 314 may have a same function as the reconstruction unit 214. The buffer 316 may have a same function as the buffer 216. The loop filter 320 may have a same function as the loop filter 220. The decoded picture buffer 330 may have a same function as the decoded picture buffer 230.

The prediction processing unit 360 may include the inter prediction unit 344 and the intra prediction unit 354. The inter prediction unit 344 may be similar to the inter prediction unit 244 in functions, and the intra prediction unit 354 may be similar to the intra prediction unit 254 in functions. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is encoded as an intra-encoded (I) slice, the intra prediction unit 354 of the prediction processing unit 360 is configured to generate the prediction block 365 for a picture block of the current video slice based on a signaled intra-prediction mode and data that is from a previously decoded block of a current frame or picture. When a video frame is encoded as an inter-encoded (B or P) slice, the inter prediction unit 344 (for example, a motion compensation unit) of the prediction processing unit 360 is configured to generate the prediction block 365 for a video block of the current video slice based on a motion vector and another syntax element that is received from the entropy decoding unit 304. For inter prediction, the prediction block may be generated from one of reference pictures in one reference picture list. The video decoder 30 may construct reference frame lists, a list 0 and a list 1, by using a default construction technology and based on reference pictures stored in the DPB 330.

The prediction processing unit 360 is configured to determine prediction information for the video block of the current video slice by parsing the motion vector and the another syntax element, and use the prediction information to generate a prediction block for the current video block that is being decoded. For example, the prediction processing unit 360 determines, by using some received syntax elements, a prediction mode (for example, intra or inter prediction) for encoding the video block in the video slice, an inter prediction slice type (for example, a B slice, a P slice, or a GPB slice), construction information of one or more of reference picture lists for the slice, a motion vector of each inter encoded video block for the slice, an inter prediction status of each inter encoded video block in the slice, and other information, to decode the video block in the current video slice.

The inverse quantization unit 310 may be configured to perform inverse quantization (namely, dequantization) on a quantized transform coefficient provided in the bitstream and decoded by the entropy decoding unit 304. An inverse quantization process may include: using a quantization parameter calculated by the video encoder 20 for each video block in the video slice, to determine a quantization degree that should be applied and, likewise, an inverse quantization degree that should be applied.

The inverse transform processing unit 312 is configured to apply an inverse transform (for example, an inverse DCT, an inverse integer transform, or a conceptually similar inverse transform process) to a transform coefficient, to generate a residual block in a pixel domain.

The reconstruction unit 314 (for example, the summator 314) is configured to add an inverse transform block 313 (namely, a reconstructed residual block 313) to the prediction block 365, for example, by adding sample values of the reconstructed residual block 313 and sample values of the prediction block 365, to obtain a reconstructed block 315 in a sample domain.

The loop filter unit 320 (during a coding loop or after a coding loop) is configured to filter the reconstructed block 315 to obtain a filtered block 321, to smooth pixel transition or improve video quality. In an example, the loop filter unit 320 may be configured to perform any combination of filtering technologies described below. The loop filter unit 320 is intended to represent one or more loop filters such as a deblocking filter, a sample-adaptive offset (SAO) filter, or another filter, for example, a bilateral filter, an adaptive loop filter (ALF), a sharpening or smoothing filter, or a collaborative filter. Although the loop filter unit 320 is shown as an in-loop filter in FIG. 3, in another implementation, the loop filter unit 320 may be implemented as a post-loop filter.

The decoded video block 321 in a given frame or picture is then stored in the decoded picture buffer 330 that stores a reference picture used for subsequent motion compensation.

The decoder 30 is configured to, for example, output a decoded picture 31 through an output 332, for presentation to a user or viewing by a user.

Another variant of the video decoder 30 may be used to decode a compressed bitstream. For example, the decoder 30 may generate an output video stream without the loop filter unit 320. For example, a non-transform based decoder 30 may directly inverse-quantize a residual signal without the inverse transform processing unit 312 for some blocks or frames. In another implementation, the video decoder 30 may have the inverse quantization unit 310 and the inverse transform processing unit 312 combined into a single unit.

Figure 4:
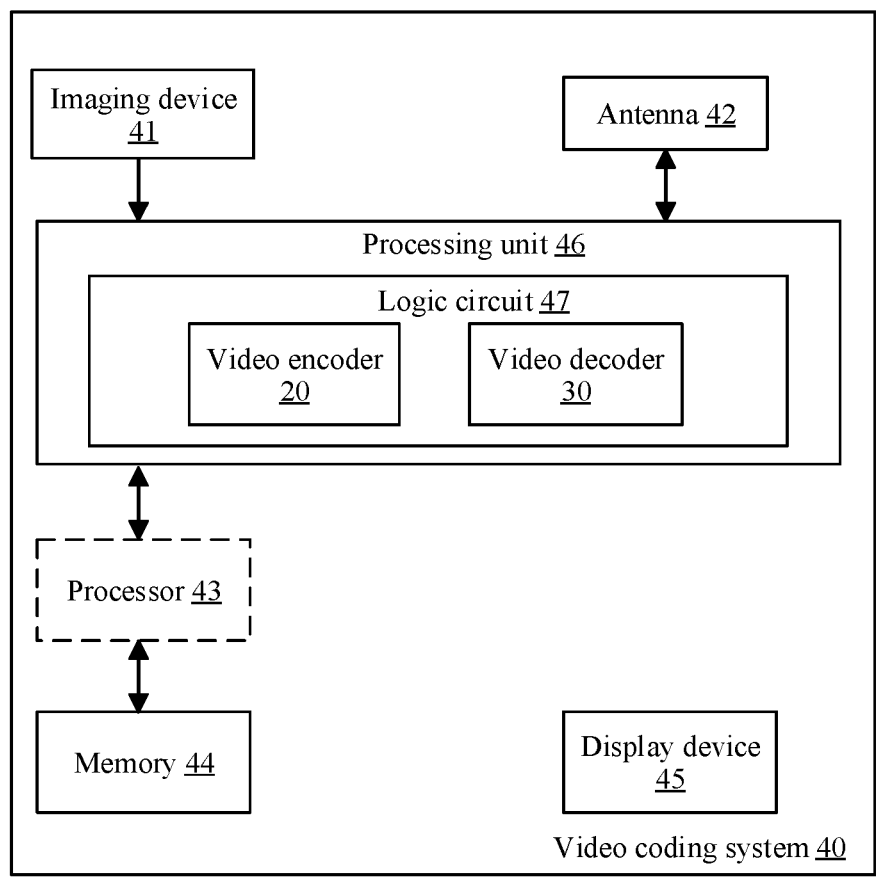
FIG. 4 is a schematic diagram illustrating a video coding system 40 including an encoder 20 of FIG. 2 and/or a decoder 30 of FIG. 3.

FIG. 4 is an illustration diagram of an example of a video coding system 40 including the encoder 20 in FIG. 2 and/or the decoder 30 in FIG. 3 according to an example embodiment. The system 40 may implement a combination of various technologies of this application. In a described implementation, the video coding system 40 may include an imaging device 41, the video encoder 20, the video decoder 30 (and/or a video encoder implemented by using a logic circuit 47 of a processing unit 46), an antenna 42, one or more processors 43, one or more memories 44, and/or a display device 45.

As shown in the figure, the imaging device 41, the antenna 42, the processing unit 46, the logic circuit 47, the video encoder 20, the video decoder 30, the processor 43, the memory 44, and/or the display device 45 can communicate with each other. As described, although the video coding system 40 is illustrated by using the video encoder 20 and the video decoder 30, in another different example, the video coding system 40 may include only the video encoder 20 or only the video decoder 30.

In some examples, as shown in the figure, the video coding system 40 may include the antenna 42. For example, the antenna 42 may be configured to transmit or receive encoded bitstreams of video data. In addition, in some examples, the video coding system 40 may include the display device 45. The display device 45 may be configured to present the video data. In some examples, as shown in the figure, the logic circuit 47 may be implemented by the processing unit 46. The processing unit 46 may include application-specific integrated circuit (ASIC) logic, a graphics processor, a general-purpose processor, or the like. The video coding system 40 may further include an optional processor 43. The optional processor 43 may similarly include application-specific integrated circuit (ASIC) logic, a graphics processor, a general-purpose processor, or the like. In some examples, the logic circuit 47 may be implemented by hardware, for example, dedicated hardware for video coding. The processor 43 may be implemented by general-purpose software, an operating system, or the like. In addition, the memory 44 may be any type of memory, for example, a volatile memory (for example, a static random access memory (SRAM) or a dynamic random access memory (DRAM)), or a nonvolatile memory (for example, a flash memory). In a non-limitative example, the memory 44 may be implemented as a cache memory. In some examples, the logic circuit 47 may access the memory 44 (for example, for implementation of a picture buffer). In another example, the logic circuit 47 and/or the processing unit 46 may include a memory (for example, a cache) for implementation of a picture buffer or the like.

In some examples, the video encoder 20 implemented by using the logic circuit may include a picture buffer (which is implemented by, for example, the processing unit 46 or the memory 44) and a graphics processing unit (which is implemented by, for example, the processing unit 46). The graphics processing unit may be communicatively coupled to the picture buffer. The graphics processing unit may include the video encoder 20 implemented by using the logic circuit 47, to implement various modules described with reference to FIG. 2 and/or any other encoder system or subsystem described in this specification. The logic circuit may be configured to perform various operations described in this specification.

The video decoder 30 may be implemented by the logic circuit 47 in a similar manner, to implement various modules described with reference to the decoder 30 in FIG. 3 and/or any other decoder system or subsystem described in this specification. In some examples, the video decoder 30 implemented by using the logic circuit may include a picture buffer (which is implemented by the processing unit 46 or the memory 44) and a graphics processing unit (which is implemented by, for example, the processing unit 46). The graphics processing unit may be communicatively coupled to the picture buffer. The graphics processing unit may include the video decoder 30 implemented by using the logic circuit 47, to implement various modules described with reference to FIG. 3 and/or any other decoder system or subsystem described in this specification.

In some examples, the antenna 42 of the video coding system 40 may be configured to receive the encoded bitstream of the video data. As described, the encoded bitstream may include data, an indicator, an index value, mode selection data, or the like that is related to video frame coding and that is described in this specification, for example, data related to coding partitioning (for example, a transform coefficient or a quantized transform coefficient, an optional indicator (as described), and/or data defining the coding partitioning). The video coding system 40 may further include the video decoder 30 that is coupled to the antenna 42 and that is configured to decode the encoded bitstream. The display device 45 is configured to present a video frame.

Figure 5:
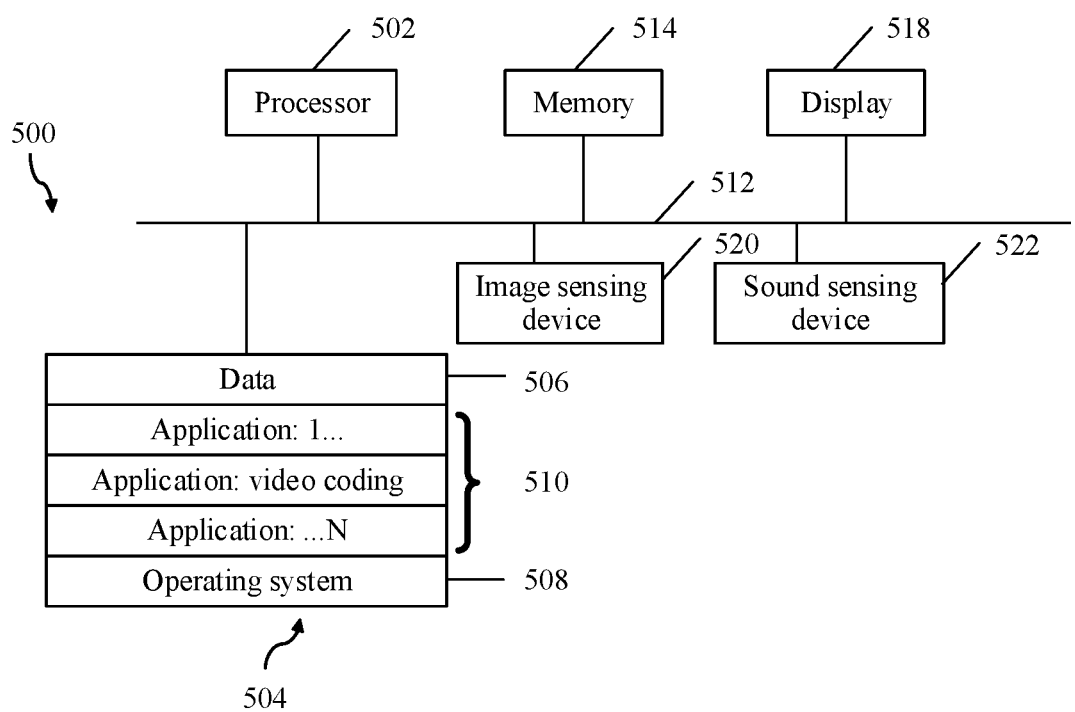
FIG. 5 is a block diagram illustrating an example of another encoding apparatus or decoding apparatus.

FIG. 5 is a simplified block diagram of an apparatus 500 that may be used as either or two of the source device 12 and the destination device 14 in FIG. 1 according to an example embodiment. The apparatus 500 may implement the technologies in this application. The apparatus 500 may be in a form of a computing system including a plurality of computing devices, or may be in a form of a single computing device such as a mobile phone, a tablet computer, a laptop computer, a notebook computer, or a desktop computer.

A processor 502 in the apparatus 500 may be a central processing unit. Alternatively, the processor 502 may be any other type of device or a plurality of devices, capable of manipulating or processing information existing or to be developed in the future. As shown in the figure, although the disclosed implementations may be practiced by using a single processor such as the processor 502, advantages in speed and efficiency may be achieved by using more than one processor.

In an implementation, a memory 504 in the apparatus 500 may be a read-only memory (ROM) device or a random access memory (RAM) device. Any other suitable type of storage device may be used as the memory 504. The memory 504 may include code and data 506 that is accessed by the processor 502 through a bus 512. The memory 504 may further include an operating system 508 and an application program 510. The application program 510 includes at least one program that allows the processor 502 to perform the method described in this specification. For example, the application program 510 may include applications 1 to N, and the applications 1 to N further include a video coding application that performs the method described in this specification. The apparatus 500 may further include an additional memory in a form of a secondary memory 514. The secondary memory 514 may be, for example, a memory card used with a mobile computing device. Because a video communication session may include a large amount of information, the information may be fully or partially stored in the secondary memory 514 and loaded into the memory 504 for processing as required.

The apparatus 500 may further include one or more output devices, for example, a display 518. In an example, the display 518 may be a touch sensitive display that combines a display with a touch sensitive element that is operable to sense a touch input. The display 518 may be coupled to the processor 502 through the bus 512. In addition to the display 518, another output device that allows a user to program the apparatus 500 or otherwise use the apparatus 500 may further be provided, or another output device may be provided as an alternative to the display 518. When the output device is or includes a display, the display may be implemented in different manners, including by using a liquid crystal display (LCD), a cathode-ray tube (CRT) display, a plasma display or light emitting diode (LED) display such as an organic LED (OLED) display.

The apparatus 500 may further include or be connected to an image sensing device 520. The image sensing device 520 is, for example, a camera or any other image sensing device 520 that can sense a picture and that is existing or to be developed in the future. The picture is, for example, a picture of a user that runs the apparatus 500. The image sensing device 520 may be placed directly facing the user that runs the apparatus 500. In an example, a location and an optical axis of the image sensing device 520 may be configured, so that a field of view of the image sensing device 520 includes a region adjacent to the display 518 and the display 518 can be seen from the region.

The apparatus 500 may further include or be connected to a sound sensing device 522. The sound sensing device 522 is, for example, a microphone or any other sound sensing device that can sense a sound near the apparatus 500 and that is existing or to be developed in the future. The sound sensing device 522 may be placed directly facing the user operating the apparatus 500, and may be configured to receive a sound, for example, a voice or another sound, made by the user when the user runs the apparatus 500.

Although the processor 502 and the memory 504 of the apparatus 500 are depicted in FIG. 5 as being integrated into a single unit, another configuration may still be used. Running of the processor 502 may be distributed in a plurality of machines (each machine has one or more processors) that can be directly coupled, or distributed in a local region or another network. The memory 504 may be distributed in a plurality of machines. For example, the memory 504 is a network-based memory or memories in a plurality of machines that run the apparatus 500. Although depicted as a single bus herein, the bus 512 of the apparatus 500 may be formed by a plurality of buses. Further, the secondary memory 514 may be directly coupled to another component of the apparatus 500 or may be accessed through a network. In addition, the secondary memory 514 may include a single integrated unit, for example, one memory card, or a plurality of units, for example, a plurality of memory cards. Therefore, the apparatus 500 may be implemented in a plurality of configurations.

Figure 6:
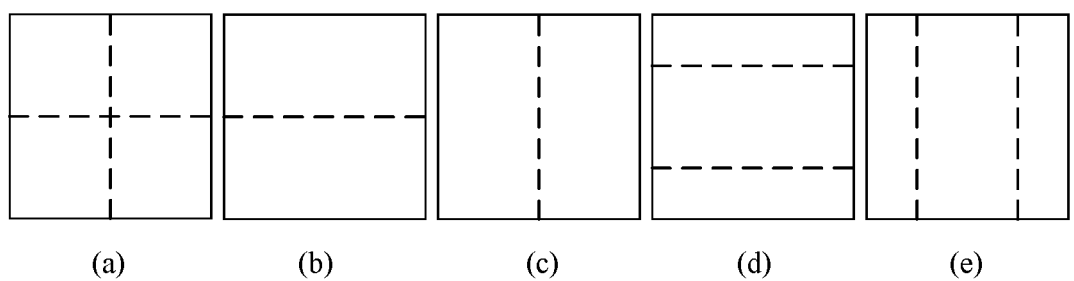
FIG. 6 is a schematic diagram illustrating split modes of a binary tree, a triple tree, and a quadtree according to an embodiment.

FIG. 6 describes split modes of a binary tree, a triple tree, and a quadtree.

The quadtree is a tree structure, indicating that one node can be split into four child nodes. In the H.265 video coding standard, a quadtree-based CTU split mode is used. A CTU is used as a root node, and each node corresponds to a square region. A node may not be split (in this case, a region corresponding to the node is a CU), or the node is split into four lower-level nodes, to be specific, the square region is split into four equal-sized square regions (a length and a width of each of the four square regions are half of a length and a width of the square region before split), and each region corresponds to one node, as shown in (a) of FIG. 6.

The binary tree is a tree structure, indicating that one node can be split into two child nodes. In an existing coding method in which the binary tree is used, a node on a binary tree structure may not be split, or the node is split into two lower-level nodes. There are two manners of splitting the node into two nodes: (1) a horizontal binary split: A region corresponding to the node is split into two equal-sized regions: an upper region and a lower region, and each region corresponds to one node, as shown in (b) of FIG. 6; or (2) a vertical binary split: A region corresponding to the node is split into two equal-sized regions: a left region and a right region, and each region corresponds to one node, as shown in (c) of FIG. 6.

The triple tree is a tree structure, indicating that one node can be split into three child nodes. In an existing coding method in which the triple tree is used, a node on a triple tree structure may not be split, or the node is split into three lower-level nodes. There are two manners of splitting the node into three nodes: (1) a horizontal ternary split: A region corresponding to the node is split into three regions: an upper region, a middle region, and a lower region, where each region corresponds to one node, and heights of the upper region, the middle region, and the lower region are respectively ¼, ½, and ¼ of a height of the node, as shown in (d) of FIG. 6; or (2) a vertical ternary split: A region corresponding to the node is split into three regions: a left region, a middle region, and a right region, where each region corresponds to one node, and widths of the left region, the middle region, and the right region are respectively ¼, ½, and ¼ of a width of the node, as shown in (e) of FIG. 6.

In the H.265 video coding standard, a frame of picture is partitioned into non-overlapping coding tree units (CTU). A CTU size may be set to 64×64 (the CTU size may alternatively be set to another value, for example, the CTU size in JVET reference software JEM is increased to 128×128 or 256×256). A 64×64 CTU includes a rectangular pixel matrix with 64 columns and 64 pixels per column, and each pixel includes a luminance component or/and a chrominance component.

In H.265, the quadtree (QT)-based CTU split mode is used. A CTU is used as a root node of a quadtree, and the CTU is recursively split into several leaf nodes in the quadtree split mode. One node corresponds to one picture region. If a node is not split, the node is referred to as a leaf node, and a picture region corresponding to the node becomes a CU. If a node is further split, a picture region corresponding to the node is split into four equal-sized regions (a length and a width of each of the four regions are respectively half of a length and a width of the split region), and each region corresponds to one node. Whether these nodes are further split needs to be separately determined. Whether a node is to be split is indicated by a split flag split_cu_flag that is in a bitstream and that corresponds to the node. A node A is split into four nodes Bi, where i=0, 1, 2, 3. Bi is referred to as a child node of A, and A is referred to as a parent node of Bi. A quadtree depth (qtDepth) of the root node is 0. A quadtree depth of a node is a quadtree depth of a parent node of the node plus 1. For brevity of description, in the following, a size and a shape of a node are a size and a shape of a picture region corresponding to the node.

More specifically, for a 64×64 CTU node (whose quadtree depth is 0), based on split_cu_flag corresponding to the CTU node, split may not be performed and the CTU node may become a 64×64 CU, or the CTU node is split into four 32×32 nodes (whose quadtree depths are 1). Each of the four 32×32 nodes may further be split or not split based on split_cu_flag corresponding to the node. If a 32×32 node is further split, four 16×16 nodes (whose quadtree depths are 2) are generated. The rest may be deduced by analogy, until no node is further split. In this way, one CTU is split into one group of CUs. A minimum size of the CU is identified in a sequence parameter set (SPS). For example, an 8×8 CU is a minimum CU. In the foregoing recursive split process, if a size of a node is equal to the minimum CU size, the node is not further split by default, and a split flag of the node does not need to be included in the bitstream.

After a node is parsed to be a leaf node, the leaf node is a CU, coding information (including information such as a prediction mode and a transform coefficient of the CU, for example, a coding_unit( ) syntax structure in H.265 corresponding to the CU is further parsed. Then, decoding processing such as prediction, dequantization, inverse transform, and loop filtering is performed on the CU based on the coding information, to generate a reconstructed picture corresponding to the CU. The quadtree structure enables the CTU to be split into a group of CUs of appropriate sizes based on a local picture feature. For example, a flat region is split into relatively large CUs, and a region with rich textures is split into relatively small CUs.

Based on the quadtree split, a binary split mode and a ternary split mode are added to versatile video coding test model (VTM) reference software. The VTM is a new codec reference software developed by the JVET.

The binary split is to split a node into two child nodes. There are two specific binary split modes: (1) the horizontal binary split: A region corresponding to the node is split into two equal-sized regions: an upper region and a lower region (to be specific, a width remains unchanged, and a height is half of a height of the region before split), and each region corresponds to one node, as shown in (b) of FIG. 6; or (2) the vertical binary split: A region corresponding to the node is split into two equal-sized regions: a left region and a right region (to be specific, a height remains unchanged, and a width is half of a width of the region before split), as shown in (c) of FIG. 6.

The ternary split is to split a node into three child nodes. There are two specific ternary split modes:

(1) the horizontal ternary split: A region corresponding to the node is split into three regions: an upper region, a middle region, and a lower region, where each region corresponds to one node, and heights of the upper region, the middle region, and the lower region are respectively ¼, ½, and ¼ of a height of the node, as shown in (d) of FIG. 6; or (2) the vertical ternary split: A region corresponding to the node is split into three regions: a left region, a middle region, and a right region, where each region corresponds to one node, and widths of the left region, the middle region, and the right region are respectively ¼, ½, and ¼ of a width of the node, as shown in (e) of FIG. 6.

In the VTM, a split mode cascading a QT and a BT/TT is used, which is referred to as QT-MTT (Quad Tree plus Multi-Type Tree) split mode for short. More specifically, the CTU is split by using the QT, to generate a QT leaf node. A node in the QT may further be split into four QT child nodes by using the quadtree split, or one QT leaf node is generated without using the quadtree split. A QT leaf node functions as a root node of an MTT. A node in the MTT may be split into child nodes by using one of the four split modes: the horizontal binary split, the vertical binary split, the horizontal ternary split, and the vertical ternary split, or becomes an MTT leaf node without being further split. A leaf node of the MTT is a coding unit CU.

Figure 7:
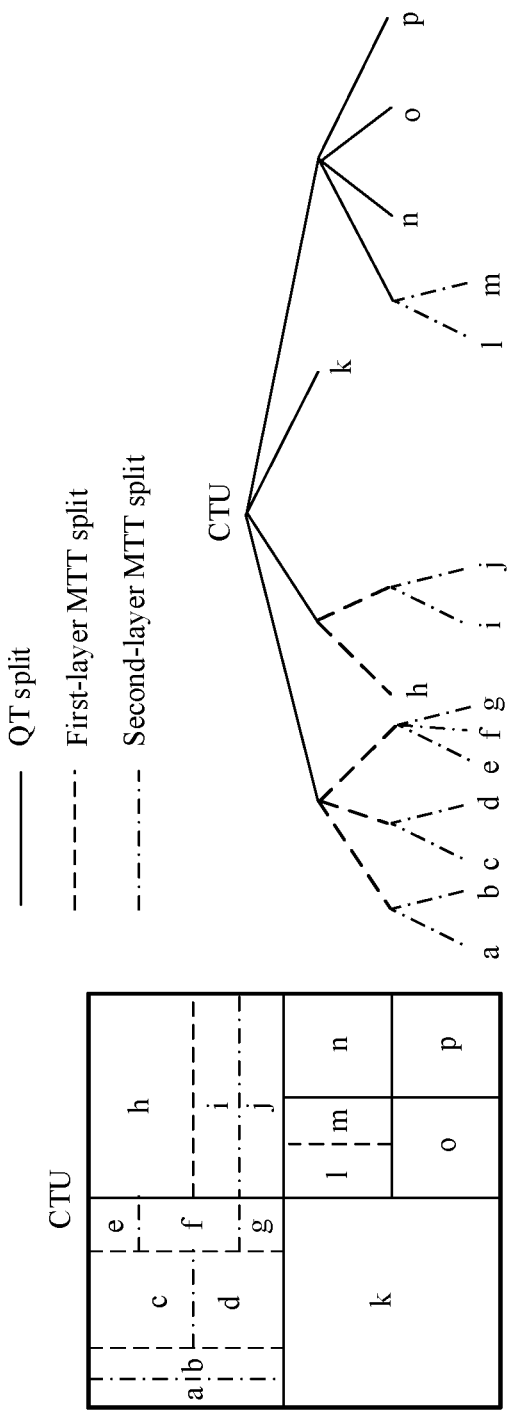
FIG. 7 is a schematic diagram illustrating a QT-MTT split according to an embodiment.

FIG. 7 shows an example in which a CTU is split into 16 CUs from a top by using a QT-MTT. In the right figure in FIG. 7, each endpoint represents one node. Four lines connected to one node indicate a quadtree split, two lines connected to one node indicate a binary split, and three lines connected to one node indicate a ternary split. A solid line indicates the QT split, a dashed line indicates a first-layer split of a MTT split, and a dot-dashed line indicates a second-layer split of the MTT split. a to p are 16 MTT leaf nodes, and each MTT leaf node is one CU. A CU split diagram shown in the left figure in FIG. 7 is obtained for a CTU by using a split mode shown in the right figure in FIG. 7.

In the QT-MTT split mode, each CU has a QT depth (Quad-tree depth) and an MTT depth (Multi-Type Tree depth). The QT depth indicates a QT depth of a QT leaf node to which the CU belongs, and the MTT depth indicates an MTT depth of an MTT leaf node to which the CU belongs. For a root node of a coding tree, a QT depth is 0 and an MTT depth is 0. If the QT split is used for a node on the coding tree, a QT depth of a child node obtained through split is a QT depth of the node plus 1, and an MTT depth remains unchanged. Similarly, if the MTT split (namely, one of the BT split or the TT split) is used for a node on the coding tree, an MTT depth of a child node obtained through split is an MTT depth of the node plus 1, and a QT depth remains unchanged. For example, in FIG. 7, a QT depth of a, b, c, d, e, f, g, i, or j is 1, and an MTT depth is 2; a QT depth of h is 1, and an MTT depth is 1; a QT depth of n, o or p is 2, and an MTT depth is 0; and a QT depth of 1 or m is 2, and an MTT depth is 1. If the CTU is split into only one CU, a QT depth of the CU is 0, and an MTT depth is 0.

Figure 8:
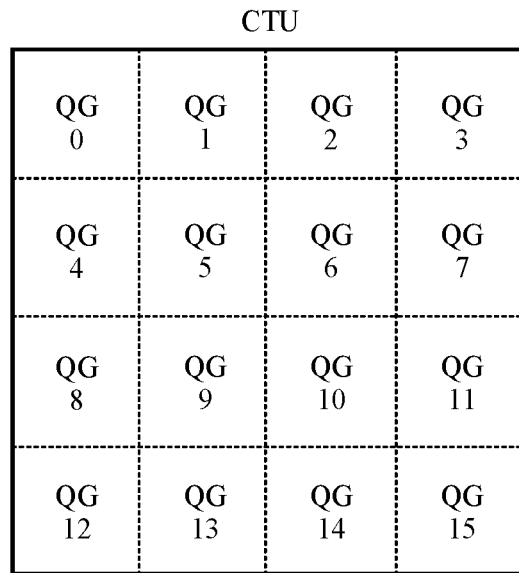
FIG. 8 is a schematic diagram illustrating a QG split according to an embodiment.

In HEVC, one CU includes one luminance block quantization parameter (QP) and two chrominance block quantization parameters, where the chrominance block quantization parameter is derived from the luminance block quantization parameter. The chrominance block quantization parameter is referred to as a chrominance QP for short, and the luminance block quantization parameter is referred to as a luminance QP for short. Decoding of a luminance QP of a current CU includes the following processing:

A diff_cu_qp_delta_depth syntax element is obtained from a picture parameter set (PPS), and a quantization group (QG) is derived based on the syntax element. To be specific, the quantization group is an N×N region, where N=CTUSize>>diff_cu_qp_delta_depth, and CTUSize is a side length of a CTU. For example, CTUSize of a 64×64 CTU is 64. A 64×64 CTU is split into M QGs whose sizes are N×N, and M is a positive integer. For example, when diff_cu_qp_delta_depth=2, the CTU is split into 16 QGs whose sizes are 16×16, as shown in FIG. 8. Because only the QT split is used in HEVC, if a QG obtained in the foregoing QG determining manner includes a plurality of CUs whose sizes are less than a size of the QG, the QG definitely includes a plurality of complete CUs. In other words, a plurality of CUs whose sizes are less than a size of a QG are fully included in the QG, and a CU whose size is less than a size of a QG cannot be included in a plurality of QGs. In addition, when only the QT split is used, a QG obtained in the foregoing QG determining manner can further ensure that if a CU has a same size as the QG, the CU is definitely included in the QG. When a CU is greater than a QG, the CU certainly includes a plurality of complete QGs.

A current quantization group (current quantization group, current QG for short) in which the current CU is located is determined, where the current QG is a QG that covers coordinates of an upper-left corner of the current CU. If the coordinates of the upper-left corner of the current CU are Pcu=(xCb, yCb), coordinates of an upper-left corner of the current quantization group are Pqg=(xQg, yQg), where $xQg=xCb-(xCb\&((1<<\text{Log 2 Min}CuQp\text{DeltaSize})-1))$ $yQg=yCb-(yCb\&((1<<\text{Log 2 Min}CuQp\text{DeltaSize})-1))$ Log 2MinCuQpDeltaSize=log 2(CTUSize)−diff_cu_qp_delta_depth, and log 2(x) is a logarithm of x with 2 as the base.

A QP delta of the current CU is obtained, for example, CuQpDeltaVal in the HEVC standard. If the current CU is a first CU having a residual in the QG (for example, if one of coded block flags cbf_luma, cbf_cb, cbf_cr of the current CU has a non-zero value, it indicates that the current CU has a residual), the QP delta of the current CU is parsed from a bitstream. The QP delta is used as QP deltas of all CUs whose coding sequences are after that of the current CU in the current QG. QP deltas of all CUs whose coding sequences are before that of the current CU in the current QG are 0.

A luminance block quantization parameter predictor of the current QG is obtained, for example, $qP_{Y\_PRED}$ in the HEVC standard. $qP_{Y\_PRED}$ may be obtained through prediction based on a luminance QP at a left neighboring location and a luminance QP at an upper neighboring location of the current QG. The left neighboring location of the current QG is (xQg−1, yQg), and the upper neighboring location is (xQg, yQg−1). The luminance QP at the upper neighboring location is a luminance QP of a coding unit covering the upper neighboring location. If the upper neighboring location is unavailable or does not belong to a same tile as the current block, the luminance QP at the upper neighboring location is set to a luminance QP of a last CU in a previous QG (for example, $qP_{Y\_PREV}$ in the HEVC standard). Similarly, the luminance QP at the left neighboring location is a luminance QP of a coding unit covering the left neighboring location. If the left neighboring location is unavailable or does not belong to a same tile as the current block, the luminance QP at the left neighboring location is set to the luminance QP of the last CU in the previous QG. There may be a plurality of methods for determining that a neighboring location is unavailable. For example, if a neighboring location is outside a current strip, the neighboring location is unavailable. For another example, if a neighboring location is outside a current picture, the neighboring location is unavailable. For another example, if a neighboring location is not inside a current CTU, the neighboring location is unavailable. For another example, if a pixel at a neighboring location is not reconstructed, the neighboring location is not available.

A luminance QP of the current CU is obtained by adding the luminance block quantization parameter predictor of the current QG to the QP delta of the current CU.

It can be learned that in the QT-MTT split mode, using the foregoing QG split mode may cause one QG to include only a part of a CU, or one CU may include a plurality of different QGs. Therefore, a new decoding (QG determining) method is required to ensure matching between a QG and a CU, that is, to ensure that one CU does not belong to two different QGs, thereby improving decoding efficiency.

FIG. 9 is a flowchart illustrating an example operation of a video decoder (for example, the video decoder 30 in FIG. 3) according to an embodiment of this application. One or more structural elements of the video decoder 30 may be used to perform the technology in FIG. 9. This embodiment includes the following operations.

Operation 901: Parse coding tree split information to obtain a current node.

The coding tree split information is obtained by the video decoder 30 from a received bitstream, and this operation may be specifically performed by an entropy decoding unit in the video decoder 30.

The current node may be a CU, for example, may be a, b, c, d, e, f, g, h, i, j, k, l, m, n, o, or p in FIG. 7. Alternatively, the current node may be a node that further needs to be split in a QT-MTT split process of a CTU. FIG. 7 is used as an example, the current node may be a node corresponding to a and b, a node corresponding to c and d, a node corresponding to e, f, and g, a node corresponding to i and j, a node corresponding to l, m, n, o, and p, a node corresponding to l and m, a node corresponding to a, b, c, d, e, f, and g, or a node corresponding to h, i, and j.

Operation 902: Determine, based on a depth N of the current node, a region covered by a current quantization group. In an implementation, determining, based on the depth N of the current node, the region covered by the current quantization group includes determining coordinates of an upper-left corner of the region covered by the current quantization group. After the coordinates of the upper-left corner are determined, a specific region covered by the current quantization group can be determined. Therefore, in the following description, determining the region covered by the current quantization group may be understood as determining the coordinates of the upper-left corner of the region covered by the current quantization group.

It may be understood that, based on different requirements, there may be different manners of determining the depth N of the current node.

In some embodiments of the present disclosure, the following four manners of determining, based on the depth N of the current node, the region covered by the current quantization group are provided.

Manner 1: Determine, based on the depth N of the current node and a first threshold T1, the region covered by the current quantization group.

Specifically, it is first determined that the depth N of the current node is greater than the first threshold T1. If the depth N of the current node is greater than the first threshold T1, an $(N-T1)^{th}$ layer parent node of the current node is obtained. Then, it is determined that the region covered by the current quantization group is a region covered by the $(N-T1)^{th}$ layer parent node. The first threshold T1 is a preset nonnegative integer, for example, may be 0, 1, 2, or 3.

There are two manners of determining the depth N of the current node. One manner is to determine the depth N of the current node as a QT depth of the current node. For example, in FIG. 7, a QT depth of the node a, b, c, d, e, f, g, h, i, j, or k is 1, and a QT depth of l, m, n, o, or p is 2. The other manner is to determine the depth N of the current node as a sum of the QT depth of the current node and an MTT depth of the current node. For example, a QT depth of the node k in FIG. 7 is 1, and an MTT depth is 0. Therefore, a depth N of the node k is 1. A QT depth of the node a in FIG. 7 is 1, and an MTT depth is 2. Therefore, a depth N of the node a is 3. A QT depth of a root node of a coding tree is 0. If a QT split is used for a node on a QT coding tree, a QT depth of a child node obtained through split is a QT depth of the node plus 1. If the QT split is not used for a node on the QT, the node is an MTT root node. An MTT depth of the MTT root node is 0. If an MTT split is used for a node on an MTT coding tree, an MTT depth of a child node obtained through split is an MTT depth of the node plus 1, and a QT depth of the child node is a QT depth of the node. In other words, starting from a CTU root node, if the current node is obtained after S1 times of QT split and S2 times of MTT split, the QT depth of the current node is S1, and the MTT depth of the current node is S2. FIG. 7 is used as an example. Nodes whose MTT depths are 1 include a node corresponding to a and b (namely, a node including a region in which a and b are located), a node corresponding to c and d, a node corresponding to e, f, and g, a node corresponding to h, a node corresponding to i and j, a node corresponding to l, and a node corresponding to m. The MTT depth being 1 indicates that a node can be obtained by performing only one MTT split on a QT leaf node obtained after the QT split is performed on the CTU. Nodes whose MTT depths are 2 include a node corresponding to a, a node corresponding to b, a node corresponding to c, a node corresponding to d, a node corresponding to e, a node corresponding to f, a node corresponding to g, a node corresponding to i, and a node corresponding to j. The MTT depth being 2 indicates that a node is obtained by performing two MTT splits on the QT leaf node obtained after the QT split is performed on the CTU. By analogy, there may also be a node whose MTT depth is 3, 4, 5, or the like (there is no node whose MTT depth is greater than 2 in FIG. 7).

Manner 2: Determine, based on the depth N of the current node and a first threshold T1, the region covered by the current quantization group. In this implementation, the depth N of the current node is determined as a QT depth of the current node.

If the depth N of the current node is greater than the first threshold T1 or a multi-type tree depth M of the current node is greater than 0, a $K^{th}$-layer quadtree node of the current node is obtained, where K=min(N, T1), and min(a, b) indicates that a smaller value between a and b is used. Then, it is determined that the region covered by the current quantization group is a region covered by the $K^{th}$-layer quadtree node. The first threshold T1 is a preset nonnegative integer, for example, may be 0, 1, 2, or 3.

The $K^{th}$-layer quadtree node is a node that includes the current node and that is generated after K times of quadtree split starting from the CTU, namely, an $(M+N-K)^{th}$-layer parent node of the current node. Coordinates (xK, yK) of an upper-left corner of the $K^{th}$-layer quadtree node are:

$$xK = xCb - (xCb \& ((1 << K1) - 1))$$

$$yK = yCb - (yCb \& ((1 << K1) - 1))$$

xCb and yCb indicate horizontal and vertical coordinates of coordinates (xCb, yCb) of an upper-left corner of the current node, and K1=log 2(CTUSize)-K.

A width and a height of the $K^{th}$-layer quadtree node are less than (1<<K1), where a<<b indicates an operation of shifting a to the left by b bits.

Manner 3: Determine, based on the depth N of the current node and a first threshold T1, the region covered by the current quantization group. The current node is a node on a QT-MTT coding tree, and the current node may further be split or may not be split.

Specifically, it is first determined whether the depth N of the current node is equal to the first threshold T1. If the depth N of the current node is equal to the first threshold T1, it is determined that the region covered by the current quantization group is a region covered by the current node. Correspondingly, coordinates of an upper-left corner of the node may be saved, and a width and a height of the node may also be saved. A CU in the current quantization group may read the saved information during processing such as luminance QP prediction.

For a value of the first threshold T1 and a manner of determining the depth N, refer to Manner 1.

Manner 4: Determine, based on the depth N of the current node and a first threshold T1, the region covered by the current quantization group. In this implementation, the depth N of the current node is determined as a QT depth of the current node.

If both a condition 1 and a condition 2 are met, it is determined that the region covered by the current quantization group is a region covered by the current node. The condition 1 is that the depth N of the current node is less than or equal to the first threshold T1. The condition 2 is that a multi-type tree depth M of the current node is equal to 0.

Manner 5: Determine, based on the depth N of the current node and a first threshold T1, the region covered by the current quantization group. In this implementation, the depth N of the current node is determined as a QT depth of the current node.

If both a condition 3 and a condition 4 are met, or a condition 5 is met, it is determined that the region covered by the current quantization group is a region covered by the current node. The condition 3 is that the depth N of the current node is equal to the first threshold T1. The condition 4 is that a multi-type tree depth M of the current node is equal to 0. The condition 5 is that the depth N of the current node is less than the first threshold T1.

Manner 6: Determine, based on the depth N of the current node and a first threshold T1, the region covered by the current quantization group. In this implementation, the depth N of the current node is determined as a QT depth of the current node.

If both a condition 3 and a condition 4 are met, or both a condition 5 and a condition 6 are met, it is determined that the region covered by the current quantization group is a region covered by the current node. The condition 3 is that the depth N of the current node is equal to the first threshold T1. The condition 4 is that a multi-type tree depth M of the current node is equal to 0. The condition 5 is that the depth N of the current node is less than the first threshold T1. The condition 6 is that the multi-type tree depth M of the current node is less than or equal to a fourth threshold T4.

The fourth threshold T4 is a preset positive integer. For example, T4 may be 1, 2, or 3. For another example, T4=T1−N.

Manner 7: Determine, based on the depth N of the current node and a first threshold T1, the region covered by the current quantization group. In this implementation, the depth N of the current node is determined as a QT depth of the current node.

If both a condition 1 and a condition 7 are met, it is determined that the region covered by the current quantization group is a region covered by the current node. The condition 1 is that the depth N of the current node is less than or equal to the first threshold T1. The condition 7 is that a multi-type tree depth M of the current node is less than equal to T1−N.

Manner 8: Determine, based on the depth N of the current node, a split mode of the current node, and a second threshold T2, the region covered by the current quantization group.

Details are as follows:

1. If the depth N of the current node is equal to the second threshold T2 minus 1, and the split mode of the current node is a ternary split mode, it is determined that the region covered by the current quantization group is a region covered by the current node.

2. Alternatively, if the depth N of the current node is equal to the second threshold T2, and the split mode of the current node is a binary split mode or a quadtree split mode, it is determined that the region covered by the current quantization group is a region covered by the current node.

3. Alternatively, if the depth of the current node is less than or equal to the second threshold, and the current node is no longer split, it is determined that the region covered by the current quantization group is a region covered by the current node. In this case, the region covered by the current quantization group is a coverage region of a CU.

The second threshold T2 is a preset positive integer. For example, the second threshold T2 may be set to X times the first threshold T1, where X is an integer greater than 1. For example, X may be 2, 3, or 4. Alternatively, T2 may be directly set to 2, 3, 4, 6, 8, 9, or the like.

The depth N of the current node is determined based on a QT depth of the current node and a binary depth Db of the current node. For example, in an implementation, $N=D_q*2+D_b$, and in another implementation, $N=D_q+D_b$. Dq is the QT depth of the current node.

An MTT split may be a binary split, a ternary split, or a quadtree split. Therefore, in different split modes, the binary depth Db of the current node may be determined in different manners. Specifically, a depth of a non-binary split needs to be converted into a binary depth. For example, the conversion may be performed in the following manner:

If the current node is an MTT root node, the binary depth Db of the current node is 0.

Alternatively, if the current node is an MTT node and is not an MTT root node (in other words, an MTT depth of the current node is greater than 0), and the current node is a child node obtained in the binary split mode, the binary depth Db of the current node is a binary depth of a direct parent node of the current node plus 1.

Alternatively, if the current node is an MTT node and is not an MTT root node, and the current node is a middle child node (namely, a middle child node in three child nodes) obtained in the ternary split mode, the binary depth Db of the current node is a binary depth of a direct parent node of the current node plus 1.

Alternatively, if the current node is an MTT node and is not an MTT root node, and the current node is a non-middle child node obtained in the ternary split mode, the binary depth Db of the current node is a binary depth of a direct parent node of the current node plus 2.

It can be learned that a depth determined in an $N=D_q*2+D_b$ manner is in a one-to-one correspondence with an area of a node. For example, when the CTU is 128×128, and a depth of the node is N, the area of the node is (128×128)>>N.

Manner 9: Determine, based on the depth N of the current node, a split mode of the current node, and a third threshold T3, the region covered by the current quantization group.

Details are as follows:

1. If the depth N of the current node is equal to the third threshold T3 minus 1, and the split mode of the current node is a ternary split mode or a quadtree split mode, it is determined that the region covered by the current quantization group is a region covered by the current node.

2. Alternatively, if the depth N of the current node is equal to the third threshold T3, and the split mode of the current node is a binary split mode, it is determined that the region covered by the current quantization group is a region covered by the current node.

3. Alternatively, if the depth N of the current node is equal to the third threshold T3, and the current node is no longer split, it is determined that the region covered by the current quantization group is a region covered by the current node. In this case, the region covered by the current quantization group is a coverage region of a CU.

The third threshold T3 may be a preset positive integer, for example, may be 3, 4, or 5.

For a manner of determining the depth N of the current node, refer to Manner 3.

Operation 903: Obtain a QP delta of a current CU in the region covered by the current quantization group.

For a specific implementation of this operation, refer to an existing implementation, for example, refer to a CuQpDeltaVal manner in the HEVC standard. More specifically, if the current CU is a first CU having a residual in the current QG, the QP delta (for example, including an absolute value and a symbol) of the current CU is parsed from the bitstream. If a coding sequence of the current CU is after that of the first CU having a residual in the current QG, the QP delta of the current CU is determined as a QP delta of the first CU having a residual in the current QG. If a coding sequence of the current CU is before that of the first CU having a residual in the current QG, the QP delta of the current CU is determined to be 0. If at least one of coded block flags (cbf) cbf_luma, cbf_cb, cbf_cr of the current CU has a non-zero value, it indicates that the current CU has a residual.

Operation 904: Obtain a reconstructed picture of the current CU based on the QP delta of the current CU.

For a specific implementation of this operation, refer to an existing implementation, for example, refer to a manner in the HEVC standard, or for another example, refer to a manner in the H.264/AVC standard. For example, a dequantized coefficient of the current CU may be obtained based on the QP delta of the current CU. A reconstructed residual block of the current CU is obtained based on the dequantized coefficient of the current CU. Then, the reconstructed picture of the current CU is obtained based on the reconstructed residual block of the current CU.

Specifically, a luminance QPA at a left neighboring location and a luminance QPB at an upper neighboring location may be first obtained based on coordinates of an upper-left corner of the current quantization group, and a luminance QP predictor of the current QG is obtained based on the QPA and the QPB. For a specific implementation, refer to a method for calculating $qP_{Y\_PRED}$ in HEVC. The coordinates of the upper-left corner of the current QG are recorded as Pqg=(xQg, yQg). The left neighboring location of the current QG is PA=(xQg-1, yQg), and the upper neighboring location of the current QG is PB=(xQg, yQg-1). The luminance QP at the upper neighboring location is a luminance QP of a coding unit covering the upper neighboring location PB. If the upper neighboring location is unavailable (for example, the upper neighboring location is outside a current strip or reconstruction of the upper neighboring location is not completed) or does not belong to a same tile as the current block, the luminance QP at the upper neighboring location is set to a luminance QP of a last CU in a previous QG (for example, $qP_{Y\_PREV}$ in the HEVC standard). Similarly, the luminance QP at the left neighboring location is a luminance QP of a coding unit covering the left neighboring location PA. If the left neighboring location is unavailable or does not belong to a same tile as the current block, the luminance QP at the left neighboring location is set to the luminance QP of the last CU in the previous QG.

The luminance QP predictor of the current QG may be obtained based on the QPA and the QPB by using one of the following methods:

Method 1: An average value of the QPA and the QPB is used as the luminance QP predictor. This method is the same as a method in HEVC.

Method 2: An area of the current CU is R1, an area of a CU at which the left neighboring location is located is R2, and an area of a CU at which the upper neighboring location is located is R3. If max(R1,R2)/min(R1,R2)*Th<max(R1, R3)/min(R1,R3), the luminance QP predictor is set to the QPA. If max(R1,R2)/min(R1,R2)>max(R1,R3)/min(R1, R3)*Th, the luminance QP predictor is set to the QPB. Otherwise, the luminance QP predictor is set to an average value of the QPA and the QPB. max(a,b) is a larger value between a and b, min(a,b) is a smaller value between a and b, and Th is a positive number greater than or equal to 1, for example, Th=1, 2, or 4.

Calculation methods of luminance QP predictors of all CUs in a QG are the same. Therefore, as a simplified implementation, when a first CU of a QG is decoded, calculation processing on a luminance QP predictor of the QG may be performed, and the luminance QP predictor is used for another CU in the QG. In this way, calculation is reduced.

Then, a luminance QP of the current CU is obtained by adding a luminance block quantization parameter predictor of the current QG to the QP delta (QP delta) of the current CU. Specifically, $Qp_Y=((qP_{T\_PRED}+CuQpDeltaVal+52+2*QpBdOffset_Y)\%(52+QpBdOffset_Y))-QpBdOffset_Y$, where $qP_{Y\_PRED}$ is the luminance block quantization parameter predictor, CuQpDeltaVal is the QP delta of the current CU, and QpBdOffsetY is a preset constant related to a bit width of a luminance component (for example, when the bit width of the luminance component is 8, QpBdOffsetY is 0; or when the bit width of the luminance component is 10, QpBdOffsetY is 12).

In an embodiment, in an improved processing manner, if a QP delta of the first CU having a residual in the current QG is not equal to 0, luminance QPs of all CUs whose coding sequences are before that of the first CU having a residual in the current QG are modified to a luminance QP of the first CU having a residual. In other words, QP deltas of all CUs in the current QG are set to the QP delta of the current CU, and QP values of all the CUs in the current QG are set to a QP value of the current CU. The specified QP value is used for a subsequent coding operation, for example, deblocking filtering or QP prediction.

After the luminance QP and the chrominance QP of the current CU are obtained, dequantization and inverse transform processing may be performed on a transform coefficient of the current CU to obtain a residual picture of the current CU.

Inter prediction processing or intra prediction processing is performed on the current CU based on a prediction mode of the current CU, to obtain an inter prediction picture or an intra prediction picture of the current CU.

The residual picture of the current CU is superimposed on the prediction picture of the current CU, to generate the reconstructed picture of the current CU.

In an implementation, after the luminance QP is obtained, the chrominance QP may further be obtained based on a mapping relationship between the luminance QP and the chrominance QP and an offset value of the chrominance QP. A specific implementation is not limited in this embodiment of the present disclosure.

Another embodiment of the present disclosure further provides a video decoder 30, including:

an entropy decoding unit 304, configured to: parse coding tree split information to obtain a current node; determine, based on a depth N of the current node, a region covered by a current quantization group; obtain a QP delta of a current CU in the region covered by the current quantization group; and determine a luminance QP of the current CU based on the QP delta of the current CU.

In an implementation, determining, based on the depth N of the current node, the region covered by the current quantization group includes determining coordinates of an upper-left corner of the region covered by the current quantization group. After the coordinates of the upper-left corner are determined, a specific region covered by the current quantization group can be determined. Therefore, in the following description, determining the region covered by the current quantization group may be understood as determining the coordinates of the upper-left corner of the region covered by the current quantization group.

An inverse quantization unit 310 is configured to obtain a dequantized coefficient of the current CU based on the luminance QP of the current CU.

An inverse transform processing unit 312 is configured to obtain a reconstructed residual block of the current CU based on the dequantized coefficient of the current CU.

A reconstruction unit 314 is configured to obtain a reconstructed picture of the current CU based on the reconstructed residual block of the current CU.

For a specific implementation of the video decoder 30, refer to the method described in FIG. 9. Details are not described herein again.

In an embodiment, the depth N of the current node is a quadtree depth N of the current node. The entropy decoding unit 304 is specifically configured to: determine, based on the depth N of the current node, the region covered by the current quantization group; or determine, based on a multi-type tree depth M of the current node, the region covered by the current quantization group. If N is greater than a first threshold T1 or M is greater than 0, the region covered by the current quantization group is a region covered by a $K^{th}$-layer quadtree node of the current node. K is a smaller value between N and T1, and the $K^{th}$-layer quadtree node is a quadtree node that includes the current node and that is generated after K times of quadtree split starting from a coding tree unit CTU.

The $K^{th}$-layer quadtree node is an $(M+N-K)^{th}$-layer parent node of the current node.

In an implementation, the depth N of the current node is a quadtree depth N of the current node. The entropy decoding unit 304 is specifically configured to determine, based on the quadtree depth N of the current node and a multi-type tree depth M of the current node, the region covered by the current quantization group. If N is less than or equal to a first threshold T1 and M is equal to 0, the region covered by the current quantization group is a region covered by the current node.

In an embodiment, the depth N of the current node is a quadtree depth N of the current node. The entropy decoding unit 304 is specifically configured to: determine, based on the quadtree depth N of the current node, the region covered by the current quantization group, or determine, based on the quadtree depth N of the current node and a multi-type tree depth M of the current node, the region covered by the current quantization group. If N is equal to a first threshold T1 and M is equal to 0, the region covered by the current quantization group is a region covered by the current node. Alternatively, if N is less than a first threshold T1, the region covered by the current quantization group is a region covered by the current node.

In an embodiment, the depth N of the current node is a quadtree depth N of the current node. The entropy decoding unit 304 is specifically configured to determine, based on the quadtree depth N of the current node and a multi-type tree depth M of the current node, the region covered by the current quantization group. If N is equal to a first threshold T1 and M is equal to 0, the region covered by the current quantization group is a region covered by the current node. Alternatively, if N is less than a first threshold T1 and M is less than or equal to a fourth threshold T4, the region covered by the current quantization group is a region covered by the current node.

In an embodiment, the fourth threshold T4 may be a preset positive integer, for example, 1, 2, 3, or 4.

In an embodiment, the fourth threshold may be determined based on the first threshold T1 and the quadtree depth N of the current node, for example, may be T4=T1−N.

In an embodiment, the depth N of the current node is a quadtree depth N of the current node. The entropy decoding unit 304 is specifically configured to determine, based on the quadtree depth N of the current node and a multi-type tree depth M of the current node, the region covered by the current quantization group. If N is less than or equal to a first threshold T1 and M is less than or equal to T1−N, the region covered by the current quantization group is a region covered by the current node.

In an embodiment, the entropy decoding unit 304 may be specifically configured to: if the depth N of the current node is greater than a first threshold T1, obtain an $(N-T1)^{th}$-layer parent node of the current node; and determine that the region covered by the current quantization group is a region covered by the $(N-T1)^{th}$-layer parent node.

In an embodiment, the entropy decoding unit 304 may be specifically configured to: if the depth N of the current node is equal to a first threshold T1, determine that the region covered by the current quantization group is a region covered by the current node.

In an embodiment, the depth of the current node is the QT depth of the current node, or the depth of the current node is a sum of the QT depth of the current node and the MTT depth of the current node.

In an embodiment, the first threshold T1 is 0, 1, 2, or 3.

In an embodiment, the entropy decoding unit 304 may further be configured to: obtain a split mode of the current node; and if the depth N of the current node is equal to a second threshold T2 minus 1, and the split mode of the current node is a ternary split mode, determine that the region covered by the current quantization group is a region covered by the current node; or if the depth N of the current node is equal to a second threshold T2, and the split mode of the current node is a binary split mode or a quadtree split mode, determine that the region covered by the current quantization group is a region covered by the current node; or if the depth N of the current node is less than or equal to a second threshold, and the current node is no longer split, determine that the region covered by the current quantization group is a region covered by the current node.

In an embodiment, the second threshold is 2, 3, 4, 6, 8, or 9.

In an embodiment, the entropy decoding unit 304 may further be configured to: obtain a split mode of the current node; and if the depth N of the current node is equal to a third threshold T3 minus 1, and the split mode of the current node is a ternary split mode or a quadtree split mode, determine that the region covered by the current quantization group is a region covered by the current node; or if the depth N of the current node is equal to a third threshold T3, and the split mode of the current node is a binary split mode, determine that the region covered by the current quantization group is a region covered by the current node; or if the depth N of the current node is equal to a third threshold T3, and the current node is no longer split, determine that the region covered by the current quantization group is a region covered by the current node.

In an embodiment, the third threshold may be 3, 4, 5, or the like.

In an embodiment, the entropy decoding unit 304 may be specifically configured to determine the depth N of the current node based on a QT depth of the current node and a binary depth Db of the current node.

In an embodiment, the entropy decoding unit 304 may be specifically configured to determine the depth N of the current node by using the following calculation formula: N=Dq*2+Db, where Dq is the QT depth of the current node.

In an embodiment, if the current node is an MTT root node, the binary depth Db of the current node is 0; or if the current node is an MTT node and is not an MTT root node, and the current node is a child node obtained in the binary split mode, the binary depth Db of the current node is a binary depth of a direct parent node of the current node plus 1; or if the current node is an MTT node and is not an MTT root node, and the current node is a middle child node obtained in the ternary split mode, the binary depth Db of the current node is a binary depth of a direct parent node of the current node plus 1; or if the current node is an MTT node and is not an MTT root node, and the current node is a non-middle child node obtained in the ternary split mode, the binary depth Db of the current node is a binary depth of a direct parent node of the current node plus 2.

In an embodiment, the entropy decoding unit 304 is further configured to: if a QP delta of a first CU having a residual in the current quantization group is not equal to 0, modify luminance QPs of all CUs whose coding sequences are before that of the first CU having a residual in the current quantization group to a luminance QP of the first CU having a residual. Correspondingly, if the current CU is a CU before the first CU having a residual in the current quantization group, the inverse quantization unit 310 is specifically configured to obtain the dequantized coefficient of the current CU based on the luminance QP of the first CU having a residual.

An embodiment of the present disclosure further provides a video decoder, including an execution circuit configured to perform any one of the foregoing methods.

An embodiment of the present disclosure further provides a video decoder, including at least one processor and a non-volatile computer-readable storage medium coupled to the at least one processor. The non-volatile computer-readable storage medium stores a computer program that can be executed by the at least one processor, and when the computer program is executed by the at least one processor, the video decoder is configured to perform any one of the foregoing methods.

An embodiment of the present disclosure further provides a computer-readable storage medium, configured to store a computer program that can be executed by at least one processor. When the computer program is executed by the at least one processor, any one of the foregoing methods is performed.

An embodiment of the present disclosure further provides a computer program. When the computer program is executed, any one of the foregoing methods is performed.

In one or more examples, the described functions may be implemented by hardware, software, firmware, or any combination thereof. If implemented by software, the functions may be stored in or transmitted over on a computer-readable medium as one or more instructions or code and executed by a hardware-based processing unit. The computer-readable medium may include a computer-readable storage medium, which corresponds to a tangible medium such as a data storage medium or a communications medium. The communications medium includes, for example, according to a communications protocol, any medium that facilitates transmission of a computer program from one place to another. In this manner, the computer-readable medium may generally correspond to: (1) a non-transitory tangible computer-readable storage medium, or (2) a communications medium such as a signal or a carrier. The data storage medium may be any usable medium that can be accessed by one or more computers or one or more processors to retrieve instructions, code, and/or data structures for implementing the technologies described in the embodiments of the present disclosure. A computer program product may include the computer-readable medium.

By way of example but not limitation, such computer-readable storage media may include a RAM, a ROM, an EEPROM, a CD-ROM or another optical disk storage, a magnetic disk storage or another magnetic storage device, a flash memory, or any other medium that can be used to store required program code in a form of an instruction or a data structure and that can be accessed by a computer. In addition, any connection may be appropriately referred to as a computer-readable medium. For example, if an instruction is transmitted from a website, a server, or another remote source by using a coaxial cable, an optical fiber cable, a twisted pair, a digital subscriber line (DSL), or wireless technologies such as infrared, radio, and microwave, the coaxial cable, the optical fiber cable, the twisted pair, the DSL, or the wireless technologies such as infrared, radio, and microwave are included in a definition of the medium. However, it should be understood that the computer-readable storage medium and the data storage medium do not include connections, carriers, signals, or other transitory media, but actually mean non-transitory tangible storage media. As used in this specification, a disk and a disc include a compact disc (CD), a laser disc, an optical disc, a digital versatile disc (DVD), a floppy disk, and a Blu-ray disc. The disk usually reproduces data magnetically, but the disc reproduces data optically by using a laser. A combination of the foregoing items should also be included in a scope of the computer-readable medium.

The instruction may be executed by one or more processors. The one or more processors are, for example, one or more digital signal processors (DSP), general-purpose microprocessors, application-specific integrated circuits (ASIC), field programmable logic array (FPGA), or other equivalent integrated or discrete logic circuits. Therefore, the term "processor" used in this specification may be any of the foregoing structures or any other structure suitable for implementing the technologies described in this specification. In addition, in some aspects, the functionality described in this specification may be provided within dedicated hardware and/or software modules configured for encoding and decoding, or incorporated in a combined codec. In addition, the technologies may be all implemented in one or more circuits or logic elements.

The technologies of this disclosure may be implemented in a wide variety of devices or apparatuses, including a wireless handset, an integrated circuit (IC) or a set of ICs (for example, a chip set). Various components, modules, or units are described in this disclosure to emphasize functional aspects of devices configured to perform the disclosed technologies, but are not necessarily implemented by different hardware units. Precisely, as described above, various units may be combined into a codec hardware unit in combination with suitable software and/or firmware, or be provided by a set of interoperative hardware units. The hardware units include the one or more processors described above.

What is claimed is:

1. A video decoding method, comprising:
   parsing coding tree split information to obtain a current node;
   determining, based on a depth N of the current node, coordinates of an upper-left corner of a region covered by a current quantization group;
   obtaining a quantization parameter (QP) delta of a current coding unit (CU) in the region covered by the current quantization group; and
   obtaining a reconstructed picture of the current CU based on the QP delta of the current CU;
   wherein the coordinates of the upper-left corner of the region covered by the current quantization group are coordinates of an upper-left corner of a region covered by the current node,
   if the depth N of the current node is equal to a second threshold T2 minus 1, and a split mode of the current node is a ternary split mode, or
   if the depth N of the current node is equal to a second threshold T2, and a split mode of the current node is a binary split mode or a quadtree split mode, or if the depth N of the current node is equal to a third threshold T3 minus 1, and a split mode of the current node is a ternary split mode or a quadtree split mode, or if the depth N of the current node is equal to a third threshold T3, and a split mode of the current node is a binary split mode.

2. The method according to claim 1, wherein the depth N of the current node is determined based on a QT depth of the current node and a binary depth (Db) of the current node.

3. The method according to claim 2, wherein the depth N of the current node is determined by using the following calculation formula:

$$N=Dq*2+Db, \text{ wherein}$$

Dq is the QT depth of the current node.

4. The method according to claim 2, wherein if the current node is a multi-type tree (MTT) root node, the binary depth (Db) of the current node is 0;

if the current node is an MTT node and is not an MTT root node, and the current node is a child node obtained in the binary split mode, the binary depth (Db) of the current node is a binary depth of a direct parent node of the current node plus 1;

if the current node is an MTT node and is not an MTT root node, and the current node is a middle child node obtained in the ternary split mode, the binary depth (Db) of the current node is a binary depth of a direct parent node of the current node plus 1; or if the current node is an MTT node and is not an MTT root node, and the current node is a non-middle child node obtained in the ternary split mode, the binary depth (Db) of the current node is a binary depth of a direct parent node of the current node plus 2.

5. The method according to claim 1, wherein if a QP delta of a first CU having a residual in the current quantization group is not equal to 0, luminance QPs of all CUs whose coding sequences are before that of the first CU having a residual in the current quantization group are modified to a luminance QP of the first CU having a residual; and if the current CU is a CU before the first CU having a residual in the current quantization group, the obtaining a reconstructed picture of the current CU based on the QP delta of the current CU comprises:

obtaining the reconstructed picture of the current CU based on the luminance QP of the first CU having a residual.

6. A video decoder, comprising:

an entropy decoding unit, configured to parse coding tree split information to obtain a current node; determine, based on a depth N of the current node, coordinates of an upper-left corner of a region covered by a current quantization group;

obtain a quantization parameter (QP) delta of a current coding unit (CU) that covers the coordinates of the upper-left corner of the region covered by the current quantization group; and determine a luminance QP of the current CU based on the QP delta of the current CU;

an inverse quantization unit, configured to obtain a dequantized coefficient of the current CU based on the luminance QP of the current CU;

an inverse transform processing unit, configured to obtain a reconstructed residual block of the current CU based on the dequantized coefficient of the current CU; and a reconstruction unit, configured to obtain a reconstructed picture of the current CU based on the reconstructed residual block of the current CU;

wherein the coordinates of the upper-left corner of the region covered by the current quantization group are coordinates of an upper-left corner of a region covered by the current node, if the depth N of the current node is equal to a second threshold T2 minus 1, and a split mode of the current node is a ternary split mode, or if the depth N of the current node is equal to a second threshold T2, and the split mode of the current node is a binary split mode or a quadtree split mode, or if the depth N of the current node is equal to a third threshold T3 minus 1, and a split mode of the current node is a ternary split mode or a quadtree split mode, or if the depth N of the current node is equal to a third threshold T3, and the split mode of the current node is a binary split mode.

7. The video decoder according to claim 6, wherein the entropy decoding unit is further configured to determine the depth N of the current node based on a QT depth of the current node and a binary depth (Db) of the current node.

8. The video decoder according to claim 7, wherein the entropy decoding unit is further configured to:

determine the depth N of the current node by using the following calculation formula:

$$N=Dq*2+Db, \text{ wherein}$$

Dq is the QT depth of the current node.

9. The video decoder according to claim 7, wherein if the current node is a multi-type tree (MTT) root node, the binary depth (Db) of the current node is 0; or if the current node is an MTT node and is not an MTT root node, and the current node is a child node obtained in the binary split mode, the binary depth (Db) of the current node is a binary depth of a direct parent node of the current node plus 1; or if the current node is an MTT node and is not an MTT root node, and the current node is a middle child node obtained in the ternary split mode, the binary depth (Db) of the current node is a binary depth of a direct parent node of the current node plus 1; or if the current node is an MTT node and is not an MTT root node, and the current node is a non-middle child node obtained in the ternary split mode, the binary depth (Db) of the current node is a binary depth of a direct parent node of the current node plus 2.

10. The video decoder according to claim 6, wherein the entropy decoding unit is further configured to: modify luminance QPs of all CUs whose coding sequences are before that of a first CU having a residual in the current quantization group to a luminance QP of the first CU having a residual if a QP delta of the first CU having a residual in the current quantization group is not equal to 0; and the inverse quantization unit is further configured to obtain the dequantized coefficient of the current CU based on the luminance QP of the first CU having a residual if the current CU is a CU before the first CU having a residual in the current quantization group.

11. A non-transitory computer-readable storage medium storing computer instructions, that when executed by one or more processors, cause the one or more processors to perform the operations of:

parsing coding tree split information to obtain a current node;

determining, based on a depth N of the current node, coordinates of an upper-left corner of a region covered by a current quantization group;

obtaining a quantization parameter (QP) delta of a current coding unit (CU) in the region covered by the current quantization group; and obtaining a reconstructed picture of the current CU based on the QP delta of the current CU;

wherein the coordinates of the upper-left corner of the region covered by the current quantization group are coordinates of an upper-left corner of a region covered by the current node, if the depth N of the current node is equal to a second threshold T2 minus 1, and a split mode of the current node is a ternary split mode, or if the depth N of the current node is equal to a second threshold T2, and a split mode of the current node is a binary split mode or a quadtree split mode, or if the depth N of the current node is equal to a third threshold T3 minus 1, and a split mode of the current node is a ternary split mode or a quadtree split mode, or if the depth N of the current node is equal to a third threshold T3, and a split mode of the current node is a binary split mode.

12. The non-transitory computer-readable storage medium of claim 11, wherein the depth N of the current node is determined based on a QT depth of the current node and a binary depth (Db) of the current node.

13. The non-transitory computer-readable storage medium of claim 12, wherein the depth N of the current node is determined by using the following calculation formula:

$N=Dq*2+Db$, wherein

Dq is the QT depth of the current node.

14. The non-transitory computer-readable storage medium of claim 12, wherein if the current node is a multi-type tree (MTT) root node, the binary depth (Db) of the current node is 0;

if the current node is an MTT node and is not an MTT root node, and the current node is a child node obtained in the binary split mode, the binary depth (Db) of the current node is a binary depth of a direct parent node of the current node plus 1;

if the current node is an MTT node and is not an MTT root node, and the current node is a middle child node obtained in the ternary split mode, the binary depth (Db) of the current node is a binary depth of a direct parent node of the current node plus 1; or if the current node is an MTT node and is not an MTT root node, and the current node is a non-middle child node obtained in the ternary split mode, the binary depth (Db) of the current node is a binary depth of a direct parent node of the current node plus 2.

15. A non-transitory computer-readable storage medium comprising a bitstream decoded by performing the operations of:

parsing, based on the bitstream, coding tree split information to obtain a current node;

determining, based on a depth N of the current node, coordinates of an upper-left corner of a region covered by a current quantization group;

obtaining a quantization parameter (QP) delta of a current coding unit (CU) in the region covered by the current quantization group; and obtaining a reconstructed picture of the current CU based on the QP delta of the current CU;

wherein the coordinates of the upper-left corner of the region covered by the current quantization group are coordinates of an upper-left corner of a region covered by the current node, if the depth N of the current node is equal to a second threshold T2 minus 1, and a split mode of the current node is a ternary split mode, or if the depth N of the current node is equal to a second threshold T2, and a split mode of the current node is a binary split mode or a quadtree split mode, or if the depth N of the current node is equal to a third threshold T3 minus 1, and a split mode of the current node is a ternary split mode or a quadtree split mode, or if the depth N of the current node is equal to a third threshold T3, and a split mode of the current node is a binary split mode.

16. The non-transitory computer-readable storage medium of claim 15, wherein the depth N of the current node is determined based on a QT depth of the current node and a binary depth (Db) of the current node.

17. The non-transitory computer-readable storage medium of claim 16, wherein the depth N of the current node is determined by using the following calculation formula:

$N=Dq*2+Db$, wherein

Dq is the QT depth of the current node.

18. The non-transitory computer-readable storage medium of claim 15, wherein if the current node is a multi-type tree (MTT) root node, a binary depth (Db) of the current node is 0;

if the current node is an MTT node and is not an MTT root node, and the current node is a child node obtained in the binary split mode, the binary depth (Db) of the current node is a binary depth of a direct parent node of the current node plus 1;

if the current node is an MTT node and is not an MTT root node, and the current node is a middle child node obtained in the ternary split mode, the binary depth (Db) of the current node is a binary depth of a direct parent node of the current node plus 1; or if the current node is an MTT node and is not an MTT root node, and the current node is a non-middle child node obtained in the ternary split mode, the binary depth (Db) of the current node is a binary depth of a direct parent node of the current node plus 2.

\* \* \* \* \*